United States Patent
Koyama et al.

(10) Patent No.: US 6,744,698 B2
(45) Date of Patent: Jun. 1, 2004

(54) BATTERY POWERED ELECTRONIC DEVICE AND CONTROL METHOD THEREFOR

(75) Inventors: Shunsuke Koyama, Chino (JP); Teruhiko Fujisawa, Shiojiri (JP); Koji Kitazawa, Shiojri (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 10/093,343

(22) Filed: Mar. 6, 2002

(65) Prior Publication Data

US 2002/0171400 A1 Nov. 21, 2002

(30) Foreign Application Priority Data

Mar. 8, 2001 (JP) .......................... 2001-65523
Mar. 23, 2001 (JP) .......................... 2001-86142

(51) Int. Cl.$^7$ .......................... G04C 3/00; G04C 11/02; H02J 7/00; H02J 7/04
(52) U.S. Cl. .......................... 368/204; 368/203; 368/47; 320/132; 320/134; 320/161
(58) Field of Search ................ 368/203–204, 368/47; 320/127–128, 132, 134, 137, 161–162, 166

(56) References Cited

U.S. PATENT DOCUMENTS

| | | | | |
|---|---|---|---|---|
| 4,058,969 A | * | 11/1977 | Tamaru et al. ............. | 368/249 |
| 4,395,138 A | * | 7/1983 | Chihara ..................... | 368/204 |
| 5,329,501 A | * | 7/1994 | Meister et al. ............. | 368/10 |
| 5,886,953 A | * | 3/1999 | Kawahara et al. ......... | 368/66 |
| 5,898,643 A | * | 4/1999 | Yasuoka et al. ........... | 368/47 |
| 5,905,437 A | | 5/1999 | Takahashi | |
| 6,396,772 B1 | * | 5/2002 | Yabe et al. ................ | 368/204 |
| 6,463,010 B1 | * | 10/2002 | Nakamiya et al. ......... | 368/84 |

FOREIGN PATENT DOCUMENTS

| | | |
|---|---|---|
| EP | 0 891 065 | 1/1999 |
| EP | 1 033 858 | 9/2000 |
| JP | 09-172741 | 6/1997 |
| JP | 09-261315 | 10/1997 |
| JP | 3064314 | 9/1999 |
| JP | 2000-253587 | 9/2000 |
| JP | 2000-295164 | 10/2000 |
| JP | 2001-339867 | 12/2001 |

* cited by examiner

Primary Examiner—David Martin
Assistant Examiner—Michael L. Lindinger
(74) Attorney, Agent, or Firm—Michael T. Gabrik

(57) ABSTRACT

A first control unit 110 and second control unit 120 are disposed to a portable data terminal 100 having a heavy load group 140 and light load group 150. The first control unit 110 detects the output voltage of a secondary battery 105 and controls power supply to the heavy load group 140 by switching a first switch S1. When the first control unit 110 stops power supply to the heavy load group 140, it outputs a low level control signal CC to the second control unit 120. The load of driving the second control unit 120 is designed to be smaller than the load of driving the first control unit 110. When the control signal CC is received, the second control unit 120 starts detecting the output voltage of the secondary battery 105, and stops power supply to the switch light load group 150 and first control unit 110 if the output voltage is detected to drop to a preset threshold voltage.

20 Claims, 29 Drawing Sheets

| SWITCH S1 | SWITCH S2 | OPERATING MODE (CURRENT CONSUMPTION) |
|---|---|---|
| ON | ON | HEAVY LOAD MODE (50mA) |
| OFF | ON | LIGHT LOAD MODE (50 $\mu$A) |
| OFF | OFF | LIGHTEST LOAD MODE (0.1 $\mu$A) |

BATTERY POWERED ELECTRONIC DEVICE AND CONTROL METHOD THEREFOR

TECHNICAL FIELD OF THE INVENTION

The present invention relates to an electronic device that operates with a battery as the power source and to a control method for the same.

RELATED ART

Notebook computers, word processors, personal digital assistants, and other such portable electronic devices, and electronic devices that are used both indoors and outdoors, such as portable Compact Disc players, televisions with liquid crystal displays, and camcorders, emphasize basic performance and ease of use during battery drive operation, that is, when driven using a battery as the power source. Considering these conditions, such electronic devices are generally comprised to use a secondary battery such as a rechargeable nickel-cadmium battery or nickel-metal hydride battery.

FIG. 11 is a block diagram showing an example of the configuration of the above electronic devices.

Electronic device 200 has a control unit 210 for constantly detecting and comparing the secondary battery output voltage with a specific threshold voltage to monitor when it is time to recharge the secondary battery, and a load group 220 comprising various loads driven by the secondary battery.

When the control unit 210 of an electronic device 200 thus comprised detects that the output voltage has dropped below the specific threshold voltage (3.0 V, for example) after starting detection of the secondary battery output voltage, it switches switch SS1 from on to off and stops power supply to the load group 220.

When the battery is used for an extended period, however, characteristics deteriorate and the internal resistance in particular increases. Therefore, when the residual capacity of the battery is low and the output voltage has dropped, a minute outflow of consumption current from the battery can produce a sharp drop in the power supply voltage, and this can lead to the control unit 210 malfunctioning.

Furthermore, power supply to the control unit 210 continues even after the power supply to the load group 220 has been stopped in the above-described electronic device. If the load of driving the control unit 210 is lighter than the various loads comprising the load group 220 (below the control unit 210 is referred to as a light load, and. load group 220 as a heavy load), the output voltage of the secondary battery recovers by being released from the heavy load (see A in FIG. 12). More specifically, because the secondary battery output voltage drops an amount equivalent to current consumption multiplied by the internal resistance of the secondary battery, the secondary battery output voltage recovers by the difference between the voltage drop during a heavy load and the voltage drop (=V; see FIG. 12) during a light load when it is released from the large heavy load of the current consumption.

When the control unit 210 detects that the secondary battery output voltage has recovered it switches the switch SS1 back from off to on and resumes power supply to the heavy load, but the output voltage of the recovered secondary battery immediately hits the threshold voltage for turning the switch SS1 off. The control unit 210 thus repeatedly runs a process whereby it supplies power to the heavy load despite being unable to drive the heavy load normally (referred to below as "false detection operation").

SUMMARY OF THE INVENTION

The present invention was conceived with consideration for the conditions described above, and a first object is to provide an electronic device capable of preventing malfunctioning due to a drop in the battery output voltage under conditions such as when the residual capacity of the battery is low. Furthermore, a second object of this invention is to provide an electronic device in which the above-noted false detection operation is prevented.

To achieve these objects, the present invention provides an electronic device characterized by comprising: a battery; multiple load units driven by the battery; a first control unit for limiting driving part of the multiple load units by the battery when the battery output voltage while driving the multiple load units drops to a first threshold voltage; and a second control unit for stopping driving at least part of the multiple load units and the first control unit when the battery output voltage drops to a second threshold voltage after driving part of the multiple load units is limited.

According to this invention, the battery output voltage is monitored by the second control unit after the battery output voltage drops and driving part of the load unit is limited, and when this reaches the second threshold voltage driving multiple load units and the first control unit is stopped. It is therefore possible to prevent malfunctioning of the first control unit in conjunction with a drop in the battery output voltage.

In a preferred aspect of the invention the multiple load units have a heavy load unit and a light load unit with less power consumption than the heavy load unit; and the first control unit stops driving the heavy load unit with the battery when the battery output voltage drops to the first threshold voltage while driving the multiple load units.

Furthermore, the first control unit may output an activation signal to start the second control unit when the battery output voltage drops to the first threshold voltage while driving the multiple load units.

Further preferably, the difference between voltage drop due to internal resistance of the battery when driving the light load unit, first control unit, and second control unit, and voltage drop due to internal resistance of the battery when driving only the second control unit, is smaller than the voltage detection resolution of the second control unit.

Furthermore, in another preferable embodiment the heavy load unit has a wireless communication unit; the first control unit has a means for controlling so that the heavy load unit is intermittently driven by the battery, and a means for terminating intermittent drive of the heavy load unit by the battery when the battery output voltage drops to the first threshold voltage while the heavy load unit is driven by the battery; and the second control unit comprises a means that responds to change in the battery output voltage faster than the first control unit, and interrupts power supply from the battery to the first control unit and terminates intermittent drive of the heavy load unit when the battery output voltage drops to or below a third threshold voltage in a period in which the heavy load unit is not driven by the battery while the heavy load unit is being intermittently driven by the battery.

Furthermore, in another preferred embodiment the electronic device comprises a third control unit that is a means that responds to change in the battery output voltage faster than the first control unit, and prohibits driving the heavy load unit by the battery when the battery output voltage while the heavy load unit is being driven by the battery drops to a fourth threshold voltage that is lower than the first threshold voltage.

In the various modes noted above the light load unit preferably includes a light load for communicating arrival of a recharge time or battery replacement time, and the first control unit drives the light load for communicating arrival of a recharge time or battery replacement time when the battery output voltage drops to the first threshold voltage while driving the multiple load units.

The light load for communicating arrival of the recharge time may be a display device for reporting arrival of the recharge time by displaying a text message or image.

The light load for communicating arrival of the recharge time may be an alarm device for reporting arrival of the recharge time by producing an alarm sound or vibration.

In a preferred mode the load units include a wireless communication function unit driven by the battery for intermittent two-way wireless communication with an external device; and the electronic device comprises a detection means for detecting a condition of the battery; and a fourth control unit for prohibiting driving a specific load unit of the multiple load units other than the wireless communication function unit if wireless communication occurs when the detection means detects that the battery condition has reached a specific state.

An electronic device thus comprised can maintain wireless communication quality even when the battery output voltage drops because driving load units other than the wireless communication function unit having the potential to adversely affect wireless communication is limited.

In a preferred mode the detection means is a circuit for detecting the battery output voltage.

Furthermore, in another preferred mode the detection means is a circuit for detecting remaining battery capacity.

The fourth control unit may determine the load unit or combination of plural load units to be prohibited from driving during wireless communication according to the battery state detected by the detection means.

In a further preferred embodiment of the invention the electronic device can assume a low power consumption mode for wireless communication of synchronization signals at a specific period for maintaining synchronization of a wireless communication network formed with an external device, or an active mode for actual wireless data communication with the external device; and the fourth control unit prohibits driving one or multiple load units other than the wireless communication function unit when in the active mode and during wireless communication of the synchronization signals in the low power consumption mode.

Said wireless communication uses, for example, Bluetooth (™).

In a preferred mode the load unit prohibited from driving during wireless communication includes any one of the following function units: a buzzer communication function unit dependent upon driving a buzzer, a vibration communication function unit dependent upon driving a motor for a vibrator, a light-emitting communication function unit dependent upon driving an LED, and a display function unit dependent upon driving a liquid crystal display unit.

Furthermore, the present invention provides a control method for an electronic device characterized by comprising: a detection step for detecting the output voltage of a battery disposed as the power source in an electronic device having a heavy load unit with high power consumption and a light load unit with low power consumption; a first control step for limiting driving the heavy load unit by the battery when the battery output voltage drops to a first threshold voltage; and a second control step for stopping driving the heavy load unit and light load unit by the battery when the battery output voltage drops to a second threshold voltage after driving a heavy load unit is limited.

This invention can also be achieved by distributing to users over an electrical communication circuit a program for running this control method on a computer controlling the electronic device, or by recording such a program to a computer-readable recording medium for distribution to users.

Furthermore, from a different perspective this invention provides an electronic device characterized by having multiple load units including a wireless communication function unit for intermittent two-way wireless communication with an external device; and a control unit for prohibiting driving at least a part of the load units other than the wireless communication function unit during wireless communication.

Furthermore, from a different perspective this invention provides an electronic device comprising a battery; a detection means for detecting an electrical condition of the battery; multiple load units including a wireless communication function unit for intermittent two-way wireless communication with an external device; and a fourth control unit for prohibiting driving a specific load unit of the multiple load units other than the wireless communication function unit if wireless communication occurs when the detection means detects that the electrical condition of the battery has reached a specific state.

Furthermore, from a different perspective this invention provides an electronic device comprising a battery; a detection means for detecting an electrical condition of the battery; multiple load units including a wireless communication function unit for intermittent two-way wireless communication with an external device; a first control unit for limiting driving part of the multiple load units by the battery when the battery output voltage drops to a first threshold voltage while driving the multiple load units; a second control unit for stopping driving at least part of the multiple load units and the first control unit when the battery output voltage drops to a second threshold voltage after driving part of the multiple load units is limited; and a fourth control unit for prohibiting driving a specific load unit of the multiple load units other than the wireless communication function unit if wireless communication occurs when the detection means detects that the electrical condition of the battery has reached a specific state.

In this case the first control unit can comprise a CPU, and the function of the fourth control unit and the function of the first control unit can be achieved with the CPU.

During wireless communication in a preferred mode the control unit prohibits driving one or multiple function units, other than the wireless communication function unit, that when driven produce electromagnetic noise greater than or equal to a specified level.

In a preferred mode the detection means is a circuit for detecting the battery output voltage.

In a further preferred mode the detection means is a circuit for detecting remaining battery capacity.

The control unit can determine the load unit or combination of plural load units to be prohibited from driving during wireless communication according to the battery state detected by the detection means.

In a further preferred mode the electronic device can assume a low power consumption mode for wireless communication of synchronization signals at a specific interval for maintaining synchronization of a wireless communication network formed with an external device, or an active mode for actual wireless data communication with the external device; and the control unit prohibits driving one or multiple load units other than the wireless communication function unit when in the active mode and during wireless communication of the synchronization signals in the low power consumption mode.

Said wireless communication uses, for example, Bluetooth (™).

In a preferred mode the load unit prohibited from driving during wireless communication includes any one of the following function units: a buzzer communication function unit dependent upon driving a buzzer, a vibration communication function unit dependent upon driving a motor for a vibrator, a light-emitting communication function unit dependent upon driving an LED, and a display function unit dependent upon driving a liquid crystal display unit.

Furthermore, from a different perspective this invention provides in a control method for an electronic device having multiple load units operated by power from a battery and including a wireless communication function unit for intermittent two-way wireless communication with an external device a detection step for detecting a battery state, and a control step for prohibiting driving a specific function unit of the multiple load units other than the wireless communication function unit if wireless communication is in progress when the battery state reaches a specific state.

In a preferred mode the electronic device control method includes a step for determining the load unit or combination of plural load units to be prohibited from driving during wireless communication according to the battery state detected by the detection means.

Furthermore, in a preferred mode the electronic device can assume a low power consumption mode for wireless communication of synchronization signals at a specific interval for maintaining synchronization of a wireless communication network formed with an external device, or an active mode for actual wireless data communication with the external device; and the control step prohibits driving one or multiple load units other than the wireless communication unit when in the active mode and during wireless communication of the synchronization signals in the low power consumption mode.

This invention can also be achieved by distributing to users over an electrical communication circuit a program for running this control method on a computer controlling the electronic device, or by recording such a program to a computer-readable recording medium for distribution to users.

DESCRIPTION OF THE PREFERRED EMBODIMENTS

An embodiment applied to a portable data terminal is described below to make the present invention easier to understand. The following embodiment shows one mode of the present invention, and can be varied as desired within the scope of the technical concept of the present invention.

A. First Embodiment (1) Configuration of the Embodiment

Figure 1:
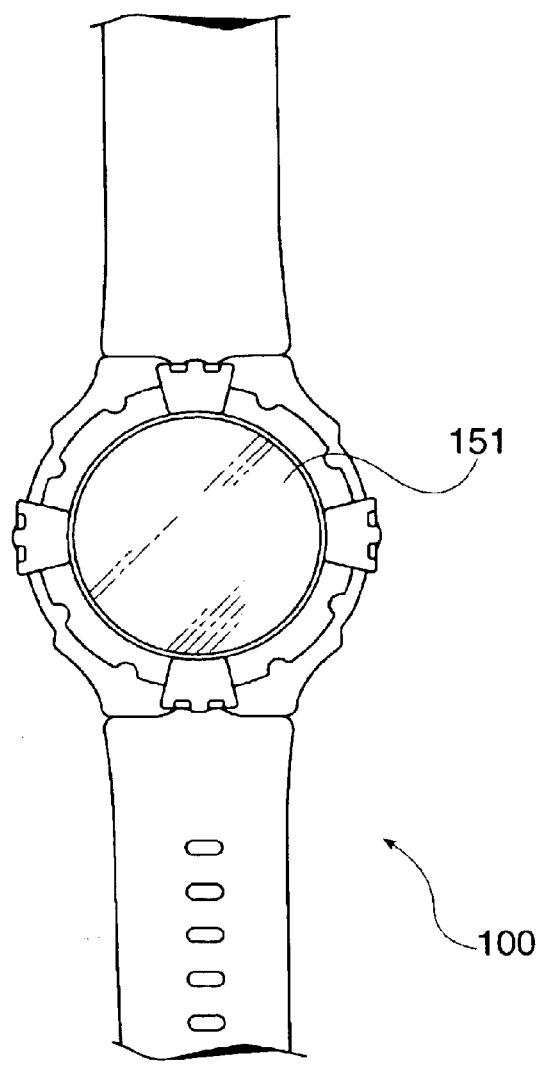
FIG. 1 shows the appearance of a portable terminal according to a first embodiment of the present invention.
Figure 2:
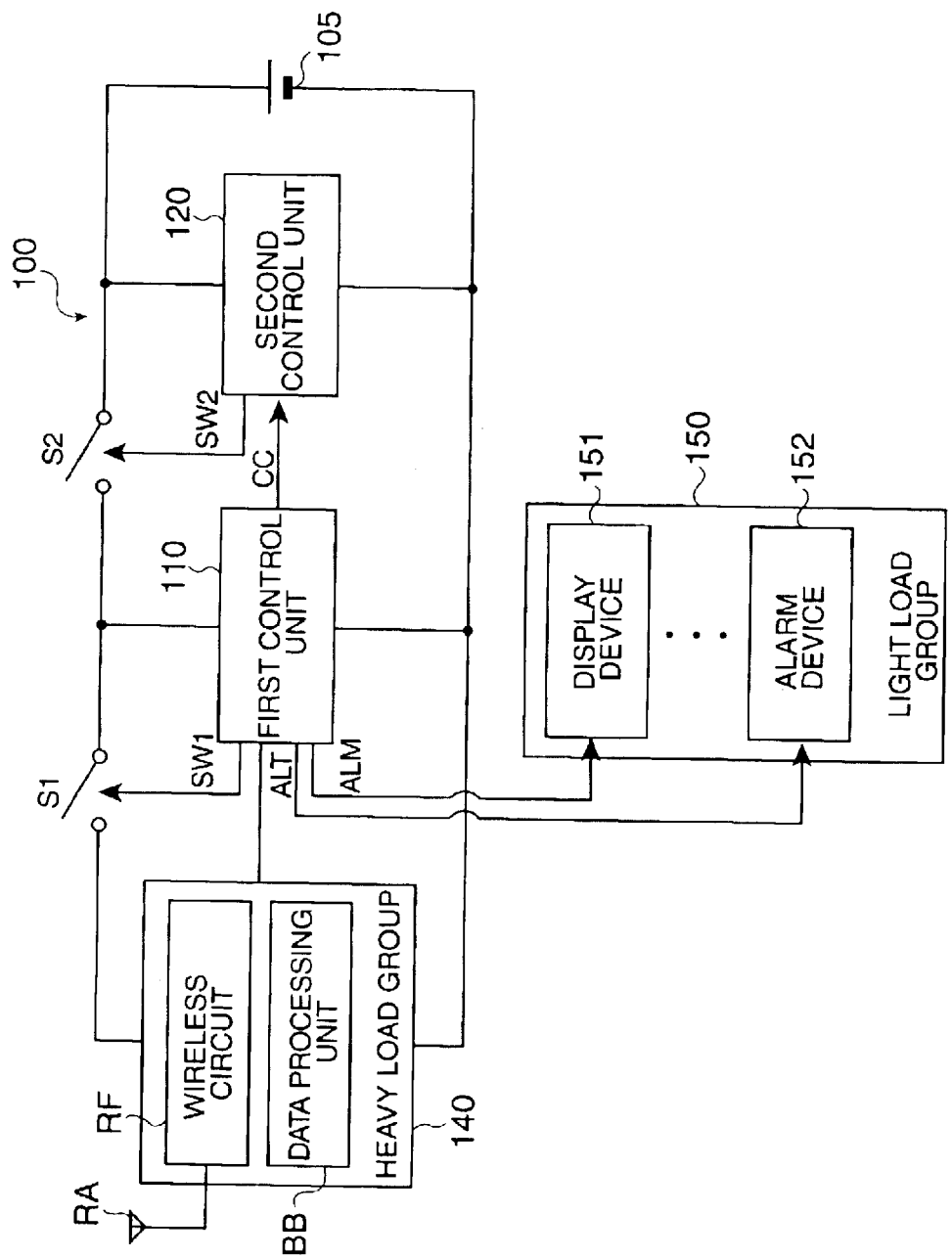
FIG. 2 is a block diagram showing the configuration of the same portable terminal.

FIG. 1 shows the appearance of a portable data terminal 100 according to a first embodiment of the present invention, and FIG. 2 is a block diagram showing the configuration of portable data terminal 100.

The portable data terminal 100 shown in FIG. 1 is a wristwatch type portable data terminal comprising a short distance wireless communication function (such as Bluetooth), and has a secondary battery 105 built in as a power source (see FIG. 2).

The secondary battery 105 is, for example, a rechargeable lithium storage battery with a 4.0-V nominal voltage, and supplies power to such parts of the terminal as the first control unit 110, second control unit 120, heavy load group 140, and light load group 150. It should be noted that a compact sealed lead storage battery, magnesium oxide-lithium storage battery, nickel-metal hydride storage battery, or silver oxide storage battery, for example, can be used instead of a lithium storage battery.

A portable terminal according to the present embodiment has two switches S1 and S2. Switch S1 is inserted between the positive supply terminal of the heavy load group 140 and the positive supply terminal of the first control unit 110 in the current path for carrying current from secondary battery 105 to the heavy load group 140. Switch S2 is inserted to the current path connecting the positive electrode of the secondary battery 105 and the first control unit 110. Current from the secondary battery 105 is thus supplied to the heavy load group 140 through both switches S1 and S2, and current is supplied from the secondary battery 105 to the first control unit 110 through switch S2.

The heavy load group (heavy load part) 140 comprises a variety of loads with heavy current consumption. This heavy load group (heavy load part) 140 includes wireless circuit RF for wireless packet communication with a portable telephone, personal computer, or other external device through antenna RA. The heavy load group (heavy load part) 140 also includes a data processing unit BB for processing a baseband signal representing audio data, for example, input through wireless circuit RF.

The light load group (light load part) 150 comprises a variety of loads with low current consumption compared with the heavy load group 140. This light load group 150 includes display device 151 and alarm device 152.

The display device 151 comprises, for example, a liquid crystal display (LCD) and liquid crystal driver circuit (not shown in the figure). This display device 151 displays the time and remaining battery capacity, for example, as controlled by the first control unit 110, and displays an alarm (such as "Charging required. Please recharge.") to notify the user when the time has come to recharge the light load group 150 based on a drive signal ALM supplied from the first control unit 110.

The alarm device 152 comprises a sound source for generating an alarm sound signal, and a speaker or vibrator (not shown in the figure) for outputting the alarm sound signal as a sound. This alarm device 152 generates an alarm sound or vibration, for example, at a preset time as controlled by the first control unit 110. Furthermore, based on drive signal ALT supplied from the first control unit 110, the alarm device 152 drives the speaker or vibrator, for example, to generate the alarm sound (a beep, for example) or vibration for notifying the user that the time to charge the light load group 150 has come.

The first control unit 110 comprises a CPU, ROM, and RAM, for example. This first control unit 110 controls the terminal parts according to various control programs stored in ROM.

The first control unit 110 also compares output voltage VC of secondary battery 105 with a first threshold voltage VH (3.0 V, for example) preset in RAM, for example. Then, as described below, it controls power supply to the heavy load group 140 based on the comparison result.

First, when the output voltage VC of secondary battery 105 is greater than the first threshold voltage VH, the first control unit 110 switches first switch S1 on by setting switching signal SW1 high, and thus supplies power to the heavy load group 140. The first control unit 110 also holds control signal CC high.

When the output voltage VC of secondary battery 105 then drops and reaches the first threshold voltage VH, first control unit 110 operates as follows. First, the first control unit 110 sets the switching signal SW1 low to turn the first switch S1 off and stop power supply to the heavy load group 140. The first control unit 110 thereafter does not monitor output voltage VC from secondary battery 105 and switch S1 remains off regardless of increase or decrease in the output voltage VC of secondary battery 105. In addition, first control unit 110 supplies drive signals ALM and ALT to the display device 151 and alarm device 152 of the light load group 150 to notify the user that the time to charge the secondary battery 105 has come. The first control unit 110 also changes the control signal CC from high to low.

After the control signal CC thus changes from high to low level, the second control unit 120 monitors the output voltage VC of secondary battery 105 in place of first control unit 110, and based on the monitoring results controls power supply to the light load group 150 and first control unit 110.

Figures 3, 4:
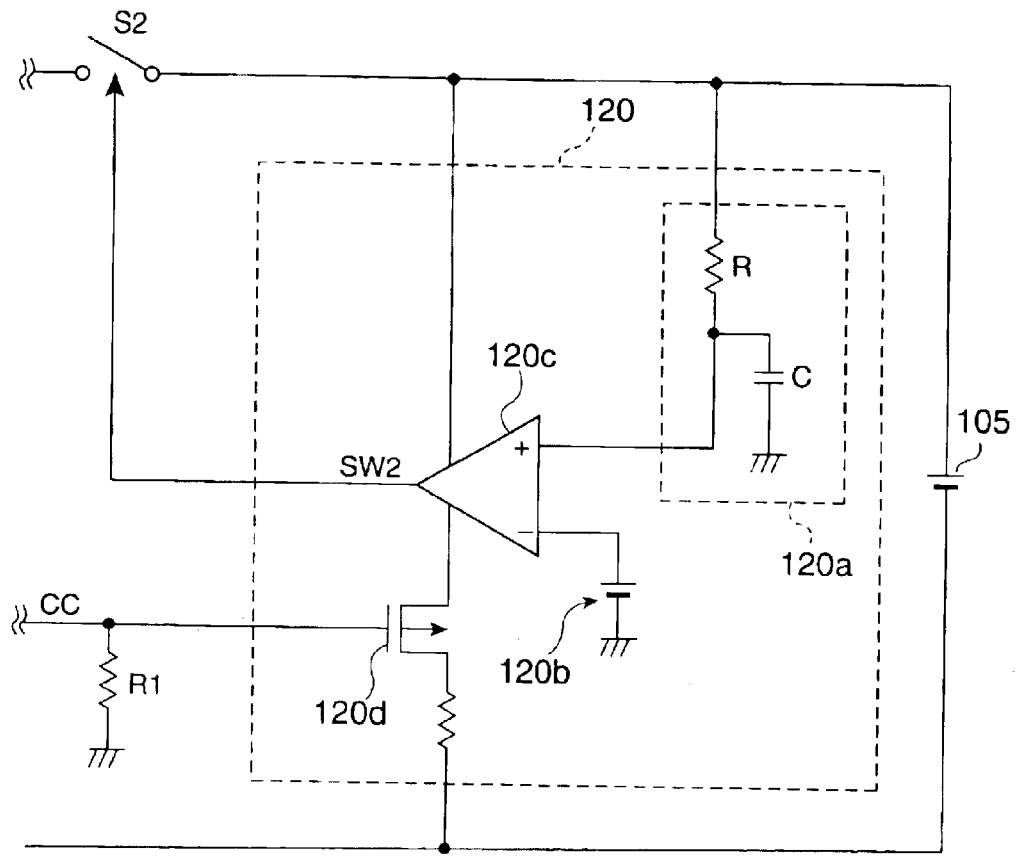
FIG. 3 is a circuit diagram showing the configuration of the second control unit of the same portable terminal.
FIG. 4 shows the relationship between each operating mode and each switch state in the same portable terminal.

FIG. 3 shows the configuration of the second control unit 120.

The second control unit 120 has a charging resistance R, capacitance C, voltage source 120b, comparator 120c, and p-channel MOS transistor 120d.

The charging resistance R and capacitance C are inserted in series between the ground line and positive supply terminal of secondary battery 105, thus forming a battery voltage holding circuit 120a. The output voltage VC of the secondary battery 105 is held in capacitance C.

The comparator 120c has a positive supply terminal and a negative supply terminal, the positive supply terminal connected to the positive terminal and the negative supply terminal connected in sequence through p-channel MOS transistor 120d and a resistance to the negative terminal of the secondary battery 105. Furthermore, the comparator 120c has a reference input terminal (−) and a comparison input terminal (+); a second threshold voltage VL (3.0 V, for example) generated by the voltage source 120b is applied to the reference input terminal, and the output voltage VC of secondary battery 105 held in capacitance C is applied to the comparison input terminal. The output terminal of the comparator 120c is connected to the positive terminal of the secondary battery 105 through a resistance or an active load such as a transistor (none shown in the figure). The gate of p-channel MOS transistor 120d goes to ground through pull-down resistance R1. The control signal CC from first control unit 110 is applied to this gate.

As already described above, when the output voltage VC of secondary battery 105 is greater than the first threshold voltage VH, the first control unit 110 holds control signal CC high. While this control signal CC is high the p-channel MOS transistor 120d is off and the negative supply terminal of the comparator 120c is floating. As a result the output voltage VC of secondary battery 105 is applied to the output terminal of comparator 120c through the above-noted resistance or transistor or other active load, and a high level switching signal SW2 is obtained from this output terminal. The switch S2 is on when the switching signal SW2 is high.

On the other hand, when the control signal CC goes low the p-channel MOS transistor 120d turns on, and the output voltage VC of secondary battery 105 is applied as the supply voltage to the comparator 120c. The comparator 120c therefore compares the second threshold voltage VL and the output voltage VC of secondary battery 105 held in capacitance C while the control signal CC is low.

When the output voltage VC of secondary battery 105 is greater than the second threshold voltage VL, second control unit 120 sets the switching signal SW2 high to turn the switch S2 on. Power is therefore supplied from the secondary battery 105 to the light load group 150 and first control unit 110.

However, when the output voltage VC of secondary battery 105 drops below the second threshold voltage VL, the second control unit 120 sets the switching signal SW2 low to turn switch the switch S2 off. This interrupts the power supply from the secondary battery 105 to the secondary battery 105 and first control unit 110.

When the power supply to the first control unit 110 is thus interrupted the signal level of the control signal CC is then held low. This is because the control signal CC signal line connecting the first control unit 110 and second control unit 120 is connected to ground through pull-down resistance R1.

Because only the comparator 120c of the second control unit 120 described above consumes power, power consumption is minimal compared with the first control unit 110. It should be noted that the p-channel MOS transistor 120d may be inserted between the positive terminal of the secondary battery 105 and the positive supply terminal of the comparator 120c instead of inserting the p-channel MOS transistor 120d between the negative supply terminal of the comparator 120c and the negative terminal of the secondary battery 105 as shown in FIG. 3. Furthermore, the negative supply terminal of the comparator 120c can be connected to the negative terminal of the secondary battery 105.

(2) Operation of the Embodiment

Figure 5:
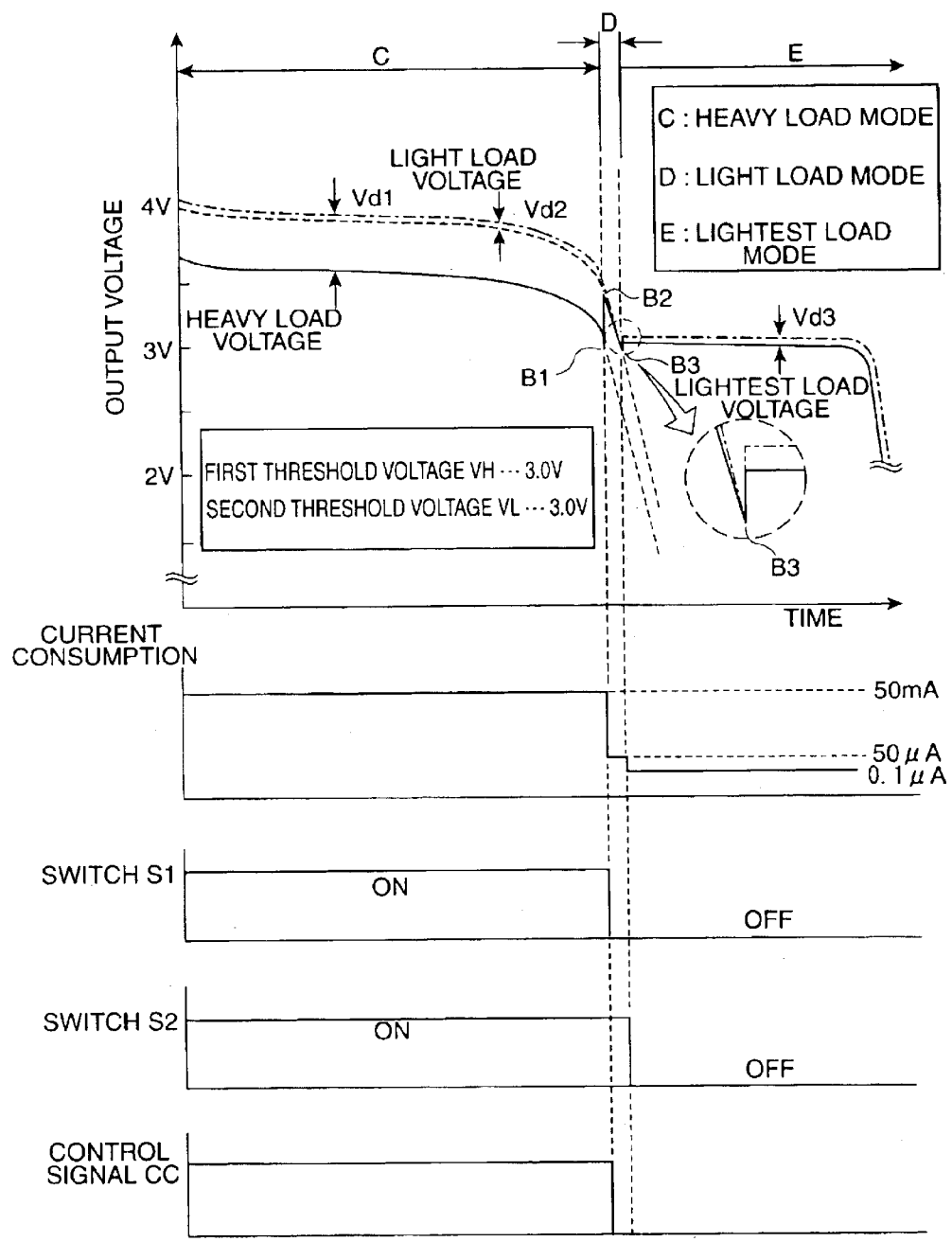
FIG. 5 is a timing chart showing the operation of the same portable terminal.

FIG. 4 shows the relationship between each operating mode and the state of switch S1 and switch S2, and FIG. 5 is a timing chart for describing the control operation of the portable data terminal 100. The operation of the present embodiment is described below with reference to these figures.

As shown in FIG. 4, both switch S1 and switch S2 are on and at least heavy load group 140 and first control unit 110 operate in the heavy load mode. This heavy load mode is the operating mode with the greatest current consumption. In the light load mode switch S1 is off and switch S2 is on, and the light load group 150 and first control unit 110 operate. Current consumption in this light load mode is less than current consumption in the heavy load mode. In the lightest load mode both switch S1 and switch S2 are off and only the second control unit 120 operates. Current consumption in this lightest load mode is the lowest. Current consumption in each of these operating modes is assumed in the following description to be 50 mA, 50 µA, and 0.1 µA, respectively (see FIG. 4). The solid line and dotted line in FIG. 5 denote the change over time in the output voltage of the secondary battery 105. This output voltage is the battery voltage of the secondary battery 105 minus the voltage drop due to internal resistance. The dot-dash line is the battery voltage of the secondary battery 105.

When the user presses the power key to turn the power on in order to use the portable data terminal 100, the operating mode of the portable data terminal 100 changes from the lightest load mode to the light load mode (communication standby state), and power supply to the first control unit 110 and light load group 150 begins. When the user then presses a certain operation key and inputs a command requesting data transmission to the portable data terminal 100, the first control unit 110 outputs a high level switching signal SW1 to the first switch S1 in order to start power supply to the heavy load group 140. When power is thus supplied to the heavy load group 140 and data communication begins, the operating mode of the portable data terminal 100 changes from the light load mode to the heavy load mode (communication mode).

When the heavy load mode is assumed the first control unit 110 begins detecting the output voltage VC of secondary battery 105 and monitors the output voltage VC by comparison with a first threshold voltage VH set in RAM, for example. While the output voltage VC is higher than the first threshold voltage VH (see C shown in FIG. 5), the first control unit 110 holds the switching signal SW1 high and continues supplying power to the heavy load group 140. When the first control unit 110 detects that the output voltage VC reached the first threshold voltage VH during data communication (see B1 shown in FIG. 5), it sets the switching signal SW1 low and turns the first switch S1 off, stopping power supply to the heavy load group 140. The operating mode of the portable data terminal 100 thus changes from the heavy load mode to the light load mode. After changing to this light load mode, first control unit 110 holds the switching signal SW1 low regardless of increase or decrease in the output voltage VC of the secondary battery 105.

The output voltage VC of the secondary battery 105 drops by the product of the load current and the internal battery resistance. If the internal battery resistance is assumed to be constant (=8Ω), the voltage drop Vd2 (=0.4×10$^{-3}$; see FIG. 5) in the light load mode with low current consumption (=50 µA) becomes smaller compared with the voltage drop Vd1 (=0.4 V; see FIG. 5) in the heavy load mode with high current consumption (=50 mA). Therefore, after changing to the light load mode the output voltage VC of secondary battery 105 recovers from the first threshold voltage VH (B1→B2 as shown in FIG. 5) and becomes able to drive the light load group 150.

When the output voltage VC of secondary battery 105 recovers the first control unit 110 generates and outputs drive signals ALM, ALT to the display device 151 and alarm device 152, respectively, and changes the control signal CC from high to low level.

When the control signal CC becomes low the second control unit 120 starts detecting the output voltage VC of secondary battery 105 in place of the first control unit 110 and compares it with the second threshold voltage VL produced in the voltage source 120b to monitor the output voltage VC. While the output voltage VC is higher than the second threshold voltage VL (see D shown in FIG. 5), the second control unit 120 holds the switching signal SW2 high and maintains power supply to the light load group 150. As a result, the display device 151 presents a message "Charging required. Please recharge." on the liquid crystal display based on drive signal ALM supplied from the first control unit 110 to notify the user that it is time to recharge the secondary battery 105, and the alarm device 152 likewise generates an alarm sound or vibration, for example, based on drive signal ALT to notify the user that it is time to charge the battery.

When the second control unit 120 then detects that the output voltage VC has reached the second threshold voltage VL (see B3 shown in FIG. 5), it outputs a low level switching signal SW2 to the second switch S2 and stops power supply to the light load group 150 and first control unit 110. The operating mode of the portable data terminal 100 changes from the light load mode to the lightest load mode as a result of turning the second switch S2 off. As described above the second control unit 120 continues to operate in the lightest load mode and continues to detect the output voltage VC of secondary battery 105 (see E shown in FIG. 5). When the operating mode of the portable data terminal 100 changes from the light load mode to the lightest load mode, the voltage drop due to the internal resistance of the secondary battery 105 is further reduced, and the output voltage VC of secondary battery 105 recovers.

If the difference between the voltage drop Vd2 in the light load mode and the voltage drop Vd3 in the lightest load mode is great, the second control unit 120 could detect recovery of the output voltage VC of secondary battery 105 and turn the second switch S2 on again.

However, recovery of the output voltage VC of secondary battery 105 is extremely slight, and recovery of the output voltage VC will not be detected by the second control unit 120. More specifically, while the variation in the output voltage VC that can generally be detected by the second control unit 120 (that is, the voltage detection resolution of the second control unit 120) is approximately ±0.05 V, the difference between the voltage drop Vd2 (=$0.4 \times 10^{-3}$ V; see FIG. 5) in the low current consumption (=50 $\mu$A) light load mode and the voltage drop Vd3 (=$0.1 \times 10^{-6}$ V; see FIG. 5) in the extremely low current consumption (=0.1 $\mu$A) lightest load mode is less than or equal to $0.4 \times 10^{-3}$ V. Therefore, when the operating mode of the portable data terminal 100 changes from the light load mode to the lightest load mode, recovery of the output voltage VC of secondary battery 105 will not be detected by the second control unit 120.

The user realizing from the alarm sound, for example, that the recharge time has come then charges the secondary battery 105. Charging methods for this secondary battery 105 include a method for charging by directly connecting the secondary battery 105 with a charger having a circuit for controlling the charging voltage and charging current by means of terminals or cables, and a method using electromagnetic induction by way of a coil. Whatever charging method is used, charging is accomplished after, for example, monitoring the initial voltage and charge current of the secondary battery 105 and confirming there are no problems with charging. This control circuit can be configured in combination with the second control unit 120 according to this embodiment of the invention, or the charger can be configured with this type of control circuit, but the appropriate configuration is preferably determined with consideration for the size limitations and ease of use of the portable data terminal 100.

When the secondary battery 105 is charged by a method such as described above, the output voltage VC recovers. When the second control unit 120 detects recovery of the output voltage VC as a result of charging the secondary battery 105, it switches switching signal SW2 from low level to high level. The second switch S2 therefore turns on, the lightest load mode changes to the light load mode, and power supply to the light load group 150 and first control unit 110 begins. It should be noted that subsequent operation can be explained as described above, and further description thereof is thus omitted.

As described above, when the process for notifying the user that it is time to charge the secondary battery ends, the operating mode of a portable data terminal according to the present embodiment changes from a low current consumption light load mode to a lightest load mode with trivial current consumption. The output voltage of the secondary battery recovers with the transition to this lightest load mode, but the recovered output voltage in this case is extremely small and recovery of the output voltage will not be detected. That is, the second control unit will not accomplish a false detection operation due to recovery of the secondary battery output voltage during the period until the secondary battery is recharged after the secondary battery is detected to have reached the discharge termination voltage.

Furthermore, when the portable data terminal is operating in the heavy load mode and the secondary battery output voltage reaches the threshold voltage, the operating mode changes from the heavy load mode to the light load mode, the light load group is driven using the recovered secondary battery output voltage due to this mode change, and the user is notified that the time to charge the secondary battery has come. It is therefore possible to reliably and sufficiently draw latent capacity from the secondary battery and notify the user that the time to charge the secondary battery has come.

(3) Alternative Examples

A preferred embodiment of the present invention is described above, but said embodiment is by way of example only and various changes can be made to the preceding embodiment without departing from the scope of the present invention. Examples of such variations include the following.

Variation 1

The aforementioned embodiment is described with the first threshold voltage VH and second threshold voltage VL set to the same value but they can be set appropriately according to the design of the portable data terminal 100, such as setting the first threshold voltage VH to 3.0 V and the second threshold voltage to 2.5 V. Furthermore, these threshold voltage levels can be determined from experience or by calculating the voltage drop of the secondary battery in conjunction with the current consumption as noted above, and these values can be used to set optimum voltage levels.

Variation 2

Part of the circuits in the heavy load group 140, such as the wireless circuit RF and data processing unit BB, can be intermittently driven in the heavy load mode in the above-described embodiment. In this case the first control unit 110 detects and compares the output voltage VC of secondary battery 105 with the first threshold voltage VH while the wireless circuit RF and data processing unit BB are operating.

Variation 3

The preceding embodiment is described using a wristwatch type portable data terminal 100 having a short distance wireless communication function, but the present invention can also be applied to a wristwatch type portable data terminal not having such a short distance wireless communication function. Furthermore, in addition to PHS (Personal Handyphone System), cellular telephones, notebook computers, pagers, and Bluetooth devices, the invention can be deployed in all types of electronic devices having various loads with different current consumption, including devices equipped with IEEE 802.11b, White Cap, IEEE 802.11a, and Wireless 1394, and devices with IrDA.

Variation 4

The preceding embodiment is described using a rechargeable secondary battery by way of example, but the present invention can also be deployed in portable data terminals using disposable primary batteries for the power source. When applied to primary batteries the latent capacity of the batteries can be sufficiently extracted to assure battery life extends for a long time.

B. Second Embodiment

Figure 6:
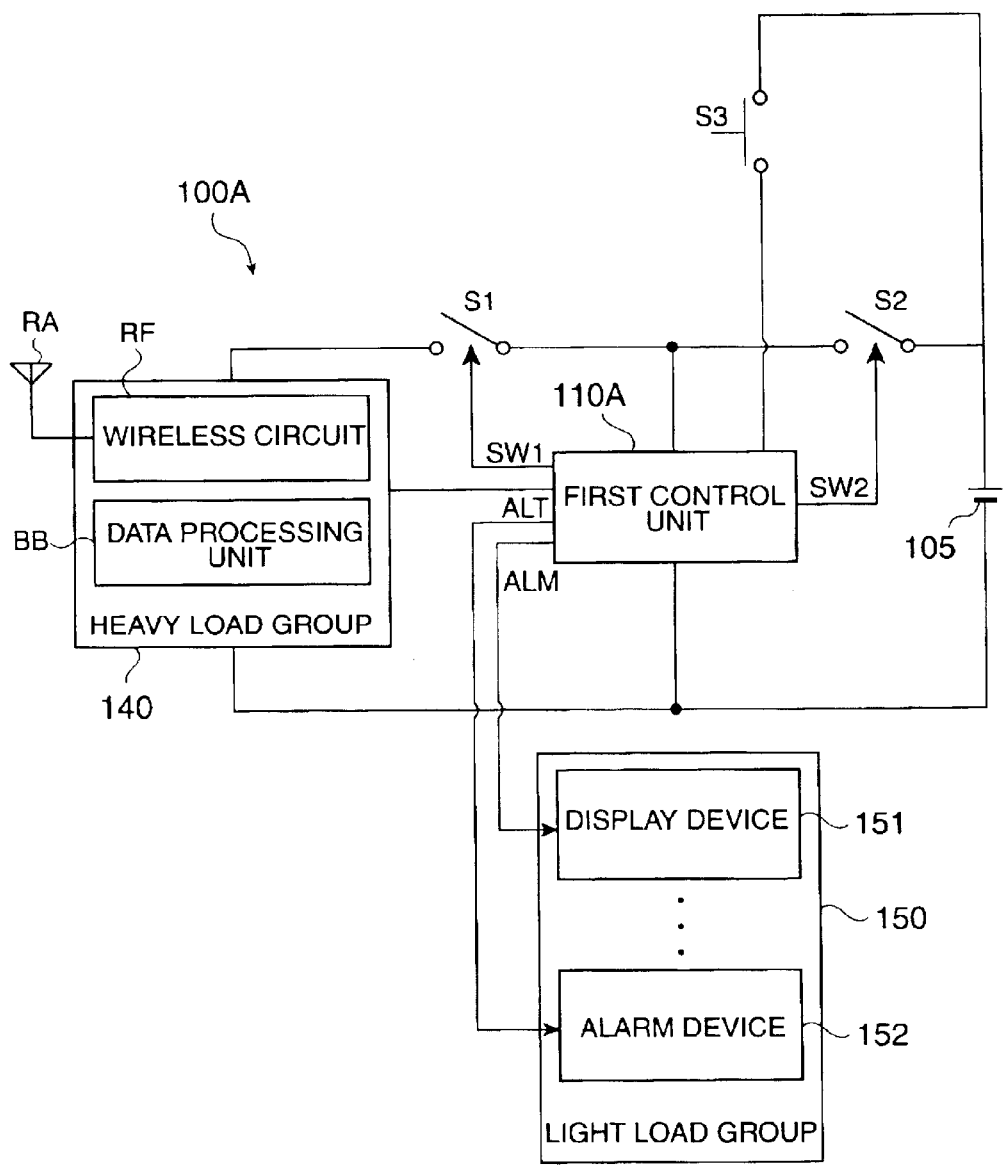
FIG. 6 is a block diagram showing the configuration of a portable terminal according to a second embodiment of this invention.

FIG. 6 shows the configuration of a portable data terminal 100A according to a second embodiment of the present invention.

A portable data terminal 100A according to this embodiment has a reset switch S3. This switch turns on only when a reset button not shown in the figure is pressed. In addition, first control unit 110A combines the functions of the first control unit 110 and second control unit 120 in the above first embodiment. Except for this the configuration of this portable data terminal 100A is substantially identical to the portable data terminal 100 shown in FIG. 2. Therefore, like parts are referenced by like reference numerals and further description thereof is omitted.

When the first control unit 110A detects that the output voltage VC of secondary battery 105 has dropped to the first threshold voltage VH, it turns the first switch S1 off. When the output voltage VC of secondary battery 105 recovers as a result of this first switch S1 turning off, the first control unit 110A generates and outputs drive signals ALM, ALT to the display device 151 and alarm device 152, respectively, reads the second threshold voltage VL from RAM, for example, and continues to monitor the output voltage VC. As described above in the first embodiment, display device 151 and alarm device 152 notify the user that it is time to recharge the secondary battery 105 based on the drive signals ALM, ALT.

When the first control unit 110A then detects that the output voltage VC of secondary battery 105 has dropped again and reached the second threshold voltage VL, it outputs a low level switching signal SW2 to the second switch S2, turning the switch S2 off and stopping power supply to all loads, including the first control unit 110A.

When the user notices from the alarm sound, for example, that the charging time has come, the user charges the secondary battery 105 and presses the reset button not shown in the figure. When the reset button is pressed by the user, reset switch S3 turns on and power supply to the first control unit 110A begins. When the first control unit 110A activates as a result of said power supply, the first control unit 110A outputs a high level switching signal SW2 to the second switch S2 in order to resume monitoring the output voltage VC of secondary battery 105. When the second switch S2 thus turns on, the first control unit 110A resumes monitoring the output voltage VC of secondary battery 105. It should be noted that operation after this can be explained as described above, and further description thereof is thus omitted.

As described above, the first control unit 110A can also be configured to control switching the first switch S1 and second switch S2. Because it is not necessary to provide a new second control unit 120 with this configuration, the parts count can be reduced and the manufacturing cost can be reduced.

It should be noted that the various functions of the first control unit 110A according to this embodiment of the invention can be achieved using software. More specifically, this software is read from a recording medium (such as a CD-ROM) recording the software and installed to the portable data terminal 100A by way of a personal computer, or the software can be downloaded over a network (such as the Internet) from a server storing the software and the software then installed to the portable data terminal 100A by way of a personal computer. The various functions described above can thus be achieved by means of software.

C. Third Embodiment

Figure 7:
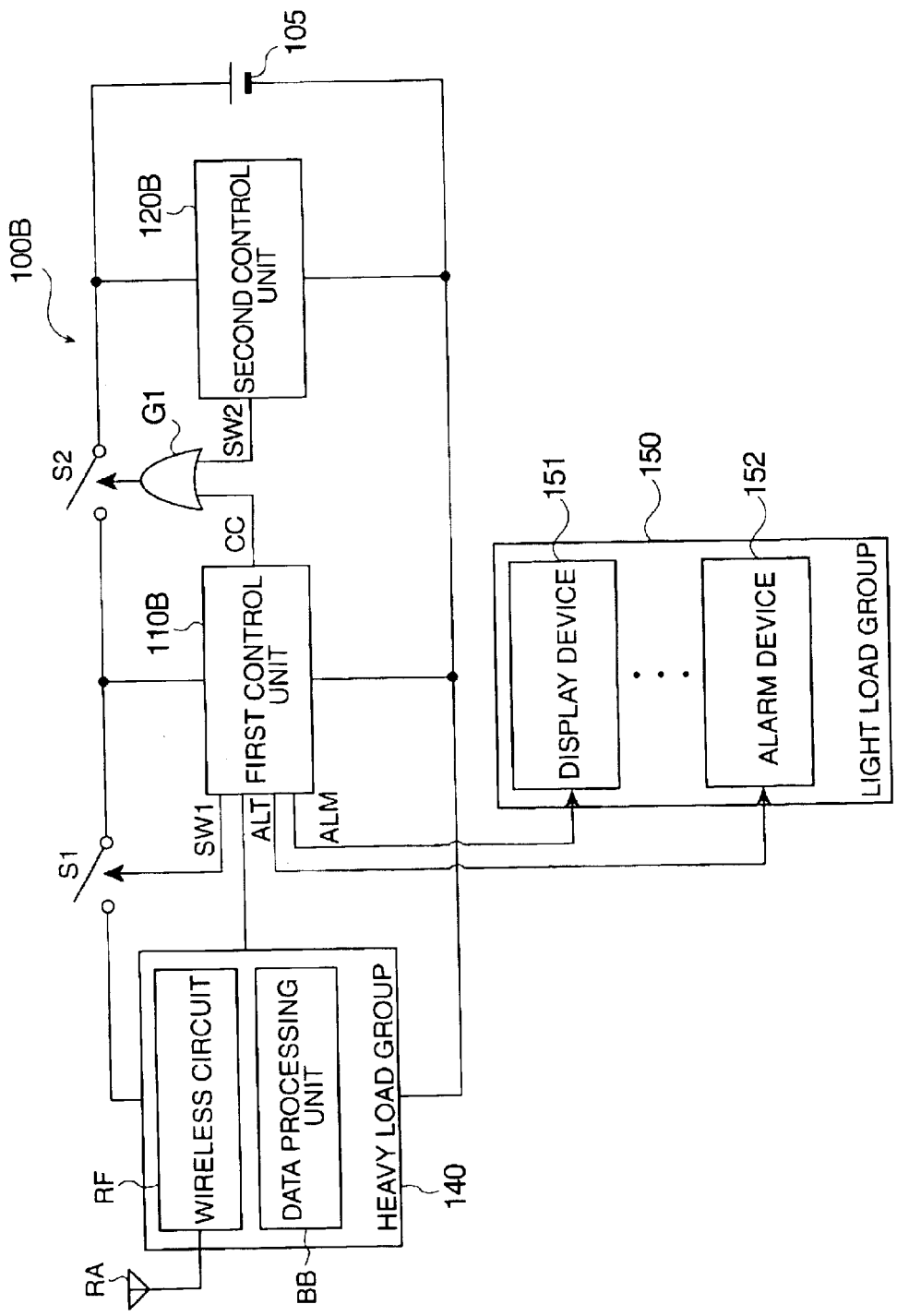
FIG. 7 is a block diagram showing the configuration of a portable terminal according to a third embodiment of this invention.

FIG. 7 is a block diagram showing the configuration of a portable data terminal 100B according to a third embodiment of the invention. This portable data terminal 100B adds an OR gate G1 to the configuration shown in FIG. 2. This OR gate G1 outputs the logical OR of the control signal CC output from first control unit 110B and the switching signal SW2 output from second control unit 120B. Switch S2 turns on when the output signal of the OR gate G1 is high, and turns off when low.

When the switch S2 is on, first control unit 110B switches switch S1 on/off and intermittently drives the heavy load group 140. More specifically, first control unit 110B turns switch S1 on by setting the switching signal SW1 high and supplies power from the secondary battery 105 to the heavy load group 140 while communication is in progress by means of the wireless circuit RF and data processing unit BB. At other times it sets the switching signal SW1 low, turning the switch S1 off and interrupting power supply to the heavy load group 140. Furthermore, the first control unit 110B compares the output voltage VC of secondary battery 105 with first threshold voltage VH while the switch S1 is on, and repeats intermittently driving the heavy load group 140 on the condition that the former is higher than the latter. Moreover, first control unit 110B sets the control signal CC high while the switch S1 is on, and at other times sets the control signal CC low.

The second control unit 120B does not have a p-channel MOS transistor 120d or resistance R1 such as shown in FIG. 3. In the second control unit 120B according to this embodiment the negative supply terminal of the comparator 120c is connected directly to the negative terminal of the secondary battery 105. The comparator 120c constantly monitors the output voltage VC of secondary battery 105, sets the switching signal SW2 to high if the output voltage VC is higher than the second threshold voltage VL, and sets the switching signal SW2 to low if it is lower.

Operation of the present embodiment is substantially identical to the first embodiment, but in the present embodiment the first control unit 110B has two opportunities to stop operation. The first opportunity is when the output voltage VC of secondary battery 105 reaches the first threshold voltage VH in the heavy load mode while intermittently driving the heavy load group 140; the second opportunity is while intermittently driving the heavy load group 140 and the output voltage VC of secondary battery 105 reaches the second threshold voltage VL in the light load mode.

Operation based on the first opportunity is described first. As described above, the first control unit 110B compares the output voltage VC of secondary battery 105 with the first threshold voltage VH while switch S1 is on. Intermittent driving of the heavy load group 140 then continues while the output voltage VC of secondary battery 105 is higher than the first threshold voltage VH. On the other hand, if the output voltage VC of secondary battery 105 drops to first threshold voltage VH, first control unit 110B stops intermittently driving the heavy load group 140, fixes the control signal CC to a low level, and performs an operation notifying the user that the recharge time is near in the same way as the first embodiment. Then, if portable data terminal 100B continues to operate without the secondary battery 105 being charged and output voltage VC of secondary battery 105 drops further, the output voltage VC in the light load mode goes to or below the second threshold voltage VL. At this time the switching signal SW2 is set to a low level by the second control unit 120B, switch S2 turns off, and power supply to the first control unit 110B is interrupted.

Operation based on the second opportunity is described next. If the output voltage VC of secondary battery 105 goes to or below the second threshold voltage VL when the switch S1 is on (in the light load mode) while the heavy load group 140 is being intermittently driven, the second control unit 120B sets the switching signal SW2 low. As a result, switch S2 turns off, power supply to the first control unit 110B is interrupted, and first control unit 110B stops all operations, including intermittent operation of the heavy load group 140.

If the internal resistance then increases due to secondary battery 105 wear, the output voltage VC of secondary battery 105 may drop sharply. Because the first control unit 110B comprises a CPU, for example, responding to a sudden drop in the output voltage VC of secondary battery 105 is difficult.

Therefore, if nothing is done and the output voltage VC of secondary battery 105 drops suddenly during intermittent operation of the heavy load group 140 to a level below the minimum voltage enabling the first control unit 110B to operate normally, first control unit 110B runaway could occur.

With this embodiment of the invention, however, the output voltage VC of secondary battery 105 is monitored in the light load mode by the second control unit 120B capable of high speed response during intermittent driving of the heavy load group 140, and switch S2 turns off immediately when it drops to or below the second threshold voltage VL. It is therefore possible to stop operation of the first control unit 110B before first control unit 110B runaway due to a sudden drop in the supply voltage.

Figure 8:
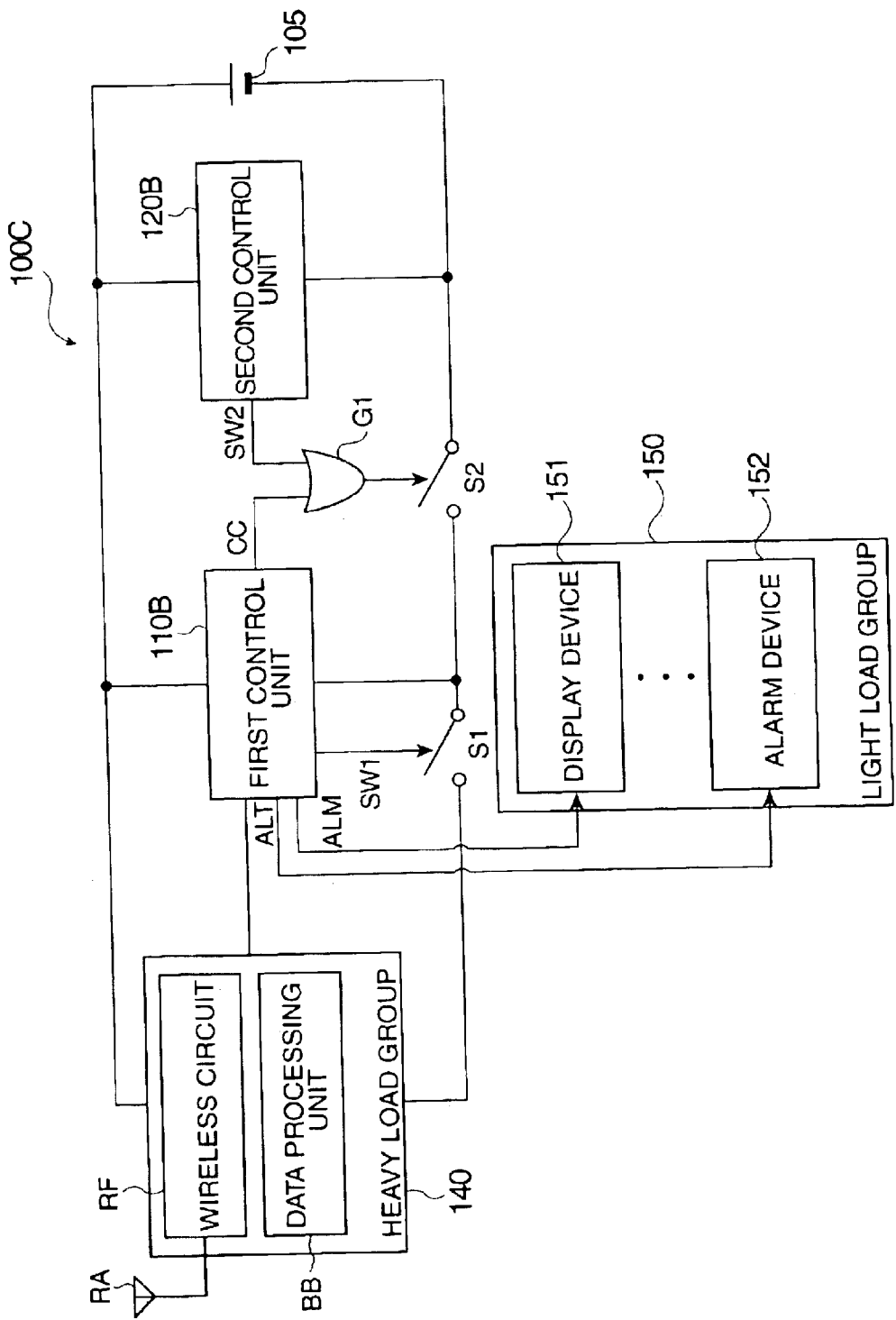
FIG. 8 is a block diagram showing the configuration of a portable terminal according to a variation of the same embodiment.

FIG. 8 is a block diagram showing the configuration of a portable data terminal 100C according to a variation of this embodiment. The locations of switches S1 and S2 in the above third embodiment are changed. That is, in this variation switch S1 is inserted between the negative supply terminal of the heavy load group 140 and the negative supply terminal of the first control unit 110B, and switch S2 is inserted between the negative supply terminal of the first control unit 110B and the negative terminal of secondary battery 105. It is otherwise the same as the third embodiment. The same operation as in the above third embodiment is also achieved in this variation.

D. Fourth Embodiment

Figure 9:
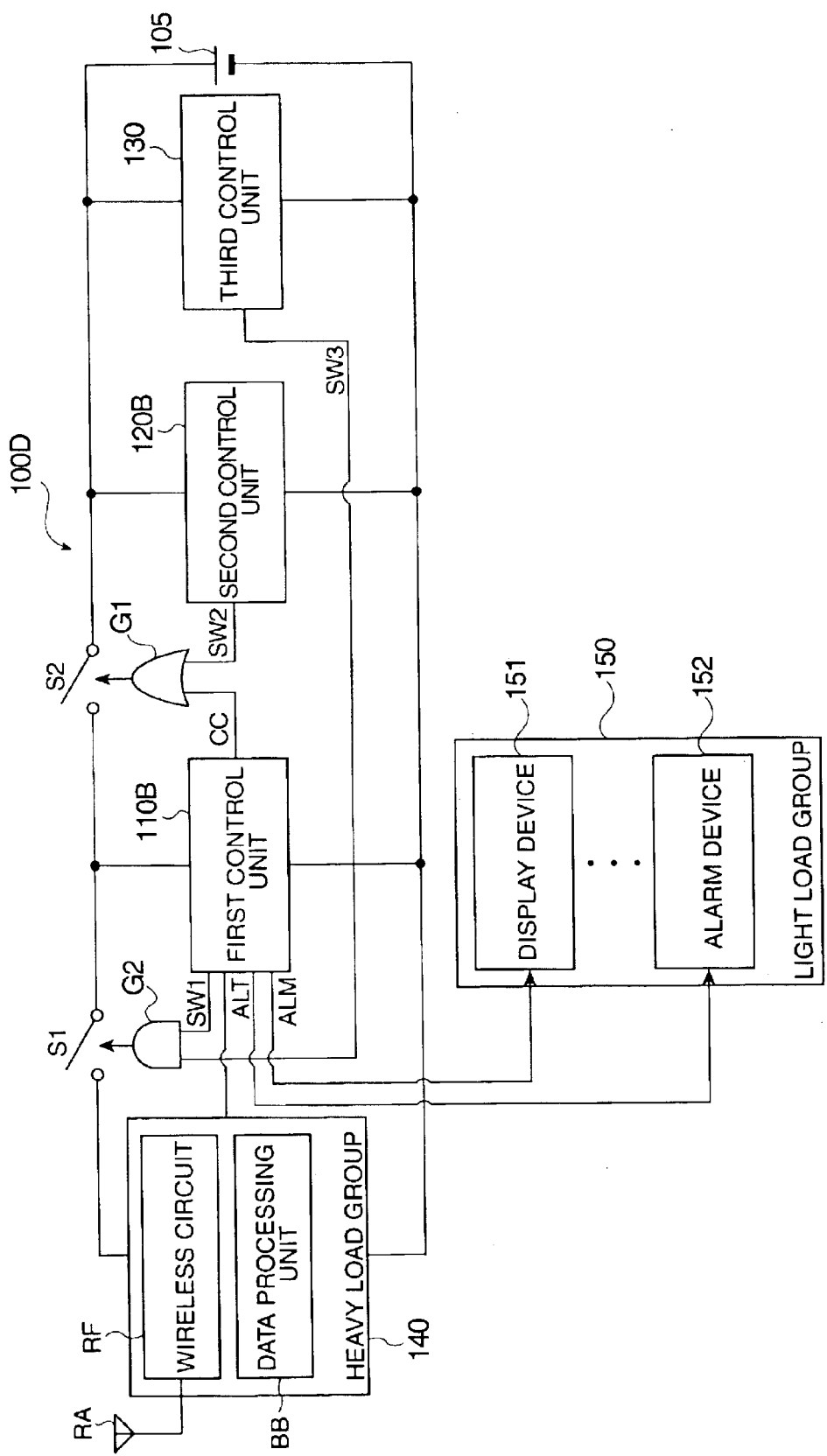
FIG. 9 is a block diagram showing the configuration of a portable terminal according to a fourth embodiment of this invention.

FIG. 9 is a block diagram showing the configuration of a portable data terminal 100D according to a fourth embodiment of the invention. This portable data terminal 100D adds a third control unit 130 and AND gate G2 to the portable data terminal B according to the third embodiment (see FIG. 7). The technical significance of these newly added elements is described here with reference to FIG. 10.

Figure 10:
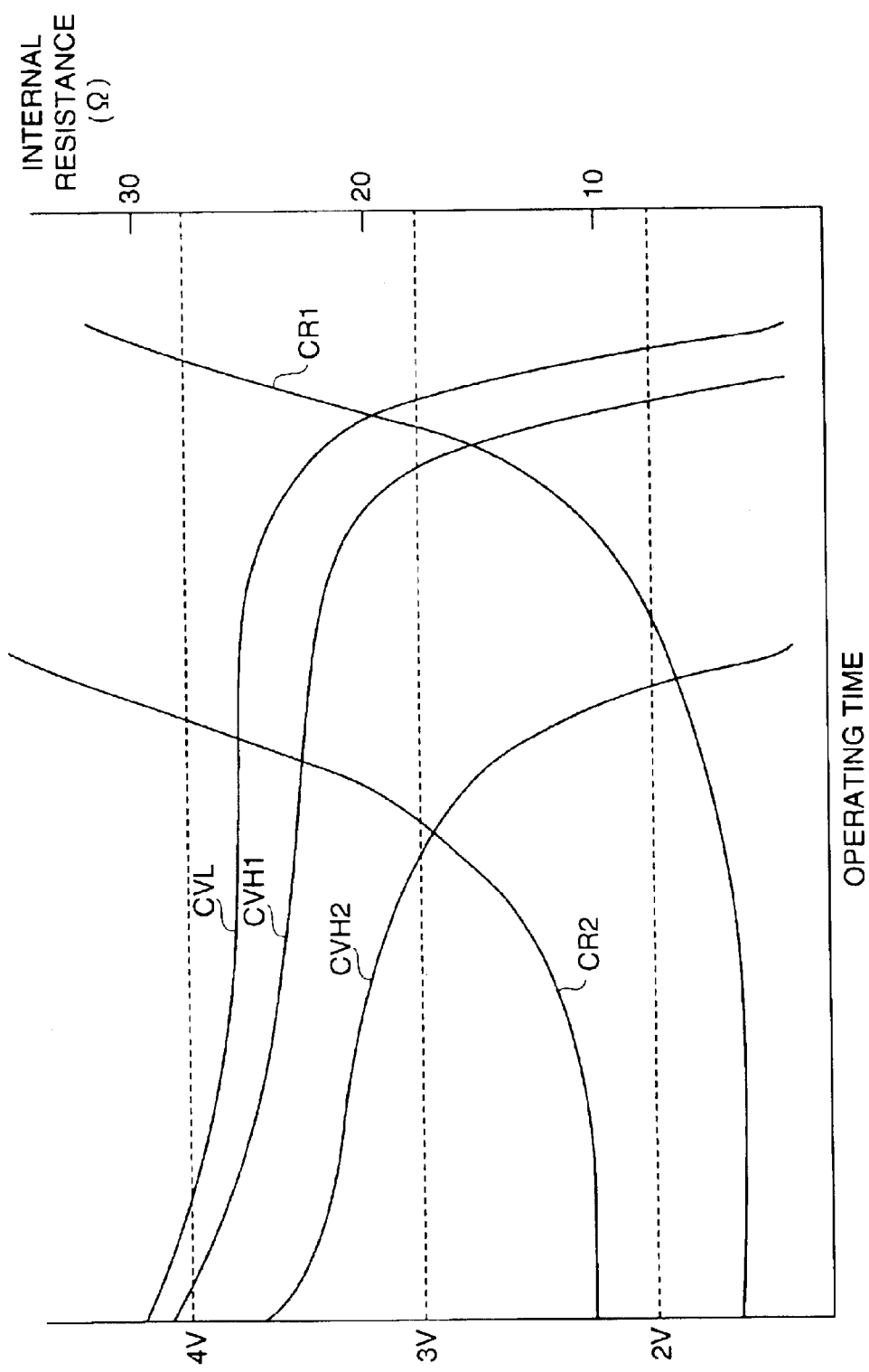
FIG. 10 describes the operation of the same embodiment.
Figure 11:
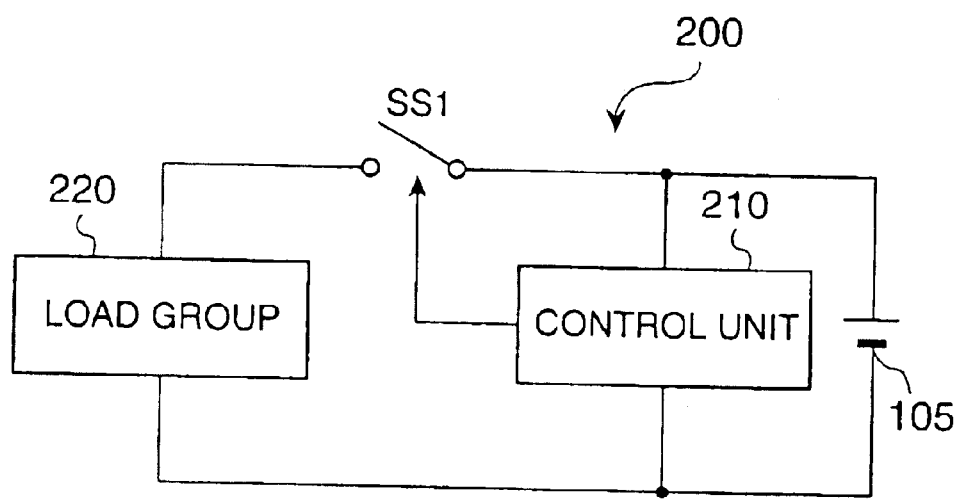
FIG. 11 shows the configuration of a conventional electronic device.
Figure 12:
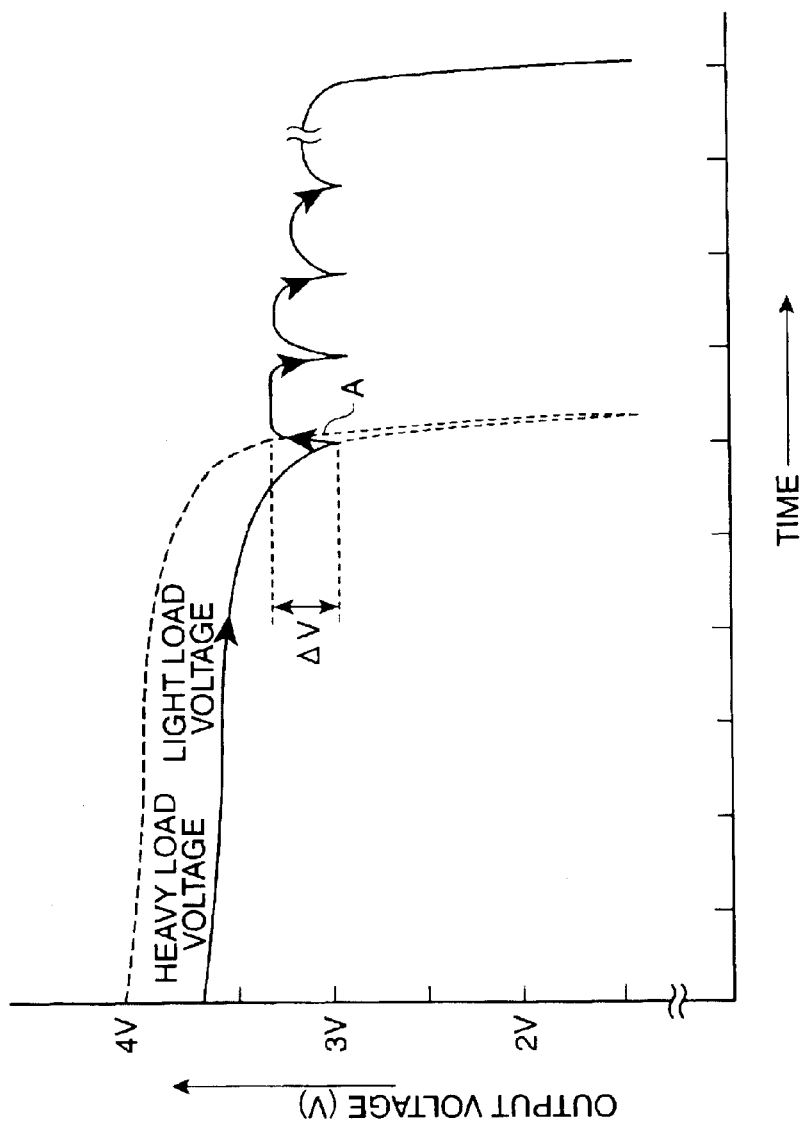
FIG. 12 shows the output voltage characteristics of a conventional electronic device.

In FIG. 10 curve CVL indicates the change in the output voltage VC with respect to operating time in the light load mode (switch S1=off, switch S2=on) of the secondary battery 105. As shown by this curve CVL, the output voltage VC in the light load mode of the secondary battery 105 gradually decreases in conjunction with an increase in the operating time of the portable data terminal, and after reaching a certain time drops at a sharper time gradient than up to that time. Furthermore, soon after the start of use the internal resistance of secondary battery 105 gradually increases with the increase in operating time as indicated by curve CR1, and at about the same time that the time gradient of the output voltage VC becomes steep, the time gradient of the increase in the internal resistance also, becomes steep. In the heavy load mode (switch S1=on, switch S2=on) the voltage drop due to the internal resistance of the secondary battery 105 increases by the current consumption of the heavy load group 140. The output voltage VC of secondary battery 105 in the heavy load mode therefore becomes a voltage lower by an amount equivalent to this increase in the voltage drop than the output voltage VC in the light load mode. Then, as indicated by curve CVH1, shortly after use a sudden drop in the output voltage VC in the heavy load mode begins about the time a sudden drop in the output voltage VC in the light load mode begins. Therefore, if in the period soon after use the second control unit 120B quickly detects that the output voltage VC of secondary battery 105 has dropped in the light load mode to or below the second threshold voltage VL and breaks the switch S2 as in the third embodiment above, it is possible to prevent first control unit 110B runaway in conjunction with a supply voltage drop.

However, if the secondary battery 105 is used for a long period of time, the internal resistance of the secondary battery 105 increases as indicated by curve CR2, and a rapid increase in the internal resistance begins earlier than a rapid drop in the output voltage VC begins in the light load mode. As a result, as indicated by curve CVH2, a sudden drop in the output voltage VC in the heavy load mode begins before a sudden drop in the output voltage VC begins in the light load mode. A sharp drop thus occurring in the output voltage VC in the heavy load mode cannot be known by detecting the output voltage of the secondary battery 105 in the light load mode. First control unit 110B runaway may therefore occur due to the supply voltage drop if something is not done.

A third control unit 130 and AND gate G2 are therefore added in the present embodiment as shown in FIG. 9.

The third control unit 130 is a simple circuit having a comparator, for example, as the main component, compares the output voltage VC of secondary battery 105 with a third threshold voltage VM slightly lower than the first threshold voltage VH, and sets a third switching signal SW3 to a high level when the output voltage VC is higher than the third threshold voltage VM and sets the third switching signal SW3 to a low level when lower. AND gate G2 outputs the logical AND of this third switching signal SW3 and the first switching signal SW1 output by first control unit 110B. Switch S1 is on when the output signal of AND gate G2 is high, and off when low.

When the lowest supply voltage enabling the CPU of the first control unit 110B to operate is 2 V, for example, in such a configuration and a slight tolerance is allowed, the first threshold voltage VH is set to 2.5 V, second threshold voltage VL to 3 V, and third threshold voltage VM to 2.4 V.

Using these as an example, operation of the present embodiment is described next.

First, intermittent driving of the heavy load group 140 and operation of the first control unit 110B is forcibly stopped if, as in the above third embodiment, the first control unit 110B detects that output voltage VC of secondary battery 105 in the heavy load mode becomes first threshold voltage VH (=2.5 V) (the first opportunity), or if the second control unit 120B detects that output voltage VC of secondary battery 105 in the light load mode during intermittent driving becomes the second threshold voltage VL (=3 V) (second opportunity), in a period soon after the start of secondary battery 105 use.

If secondary battery 105 use then continues for a long time the output voltage VC of secondary battery 105 in the heavy load mode exhibits a time change as indicated by curve CVH2 in FIG. 10. It is assumed that under such conditions the output voltage VC of secondary battery 105 during intermittently driving the heavy load group 140 drops sharply and reaches the third threshold voltage VM (=2.4 V).

Because the first control unit 110B is comprised of a CPU, after the output voltage VC drops to the first threshold voltage VH (=2.5 V) or below, approximately 2 ms is required to set the first switching signal SW1 to a low level in response. Because the third control unit 130 is a simple circuit having a comparator as the major component, it can set the third threshold voltage VM to low in approximately 0.1 ms after the output voltage VC reaches the third threshold voltage VM (=2.4 V), and can force switch S1 off. It is therefore possible to prevent runaway of the first control unit 110B due to a supply voltage drop.

Variations of the above-described first to fourth embodiments such as noted below are possible. That is, a variation that measures the internal resistance of battery 105 and based on this internal resistance value changes the conditions for load driving by the battery 105. This variation can be applied to the first embodiment, for example, as follows.

During intermittent driving of the wireless circuit RF, first control unit 110 determines the difference between the output voltage of secondary battery 105 while driving and the output voltage when not driving the wireless circuit RF, and calculates the internal resistance of battery 105 from this difference. Then, when this internal resistance rises and reaches a specific threshold value, switch S1 turns off, an alarm is output by alarm device 152, and the second control unit 120 is driven.

This variation can more accurately determine the timing for changing the load driving conditions because the internal resistance is measured and the battery condition is determined based on this.

E. Fifth Embodiment

Wireless communication technology using the Bluetooth (™) standard as one technology for wirelessly connecting such data terminals as cell phones, notebook computers, and wristwatch type compact data devices (referred to below as wristwatches) has been proposed.

Because wireless data transmission and reception between data terminals located a specific short distance apart is possible using this technology, data in a notebook computer can be displayed on the display of a wristwatch when the user operates the wristwatch, for example, or receipt of a call can be reported from a portable terminal when a call is received by a cell phone.

Wristwatches, however, are generally battery powered. There are also wristwatches that have a buzzer for alarms or a motor for a vibrator. When too much current is consumed from the battery due to driving the alarm buzzer or vibrator motor in such a wristwatch, there may be a dramatic drop in battery output voltage. If such a sudden drop in the battery output voltage occurs during wireless data communication using the wireless communication function of the wristwatch, this can result in such problems as communication being cut off. These problems occur easily particularly when the battery is worn, battery output voltage is down, and too much current is consumed from the battery.

Furthermore, electromagnetic noise occurs as a result of driving the alarm buzzer or vibrator motor, and this is a factor having an adverse effect on wireless communication quality.

The present embodiment is directed to the above points, and an object is to assure normal execution of a wireless communication function in a portable wireless device having numerous functional units including a wireless communication function unit.

(1) Configuration of the Embodiment

Figure 13:
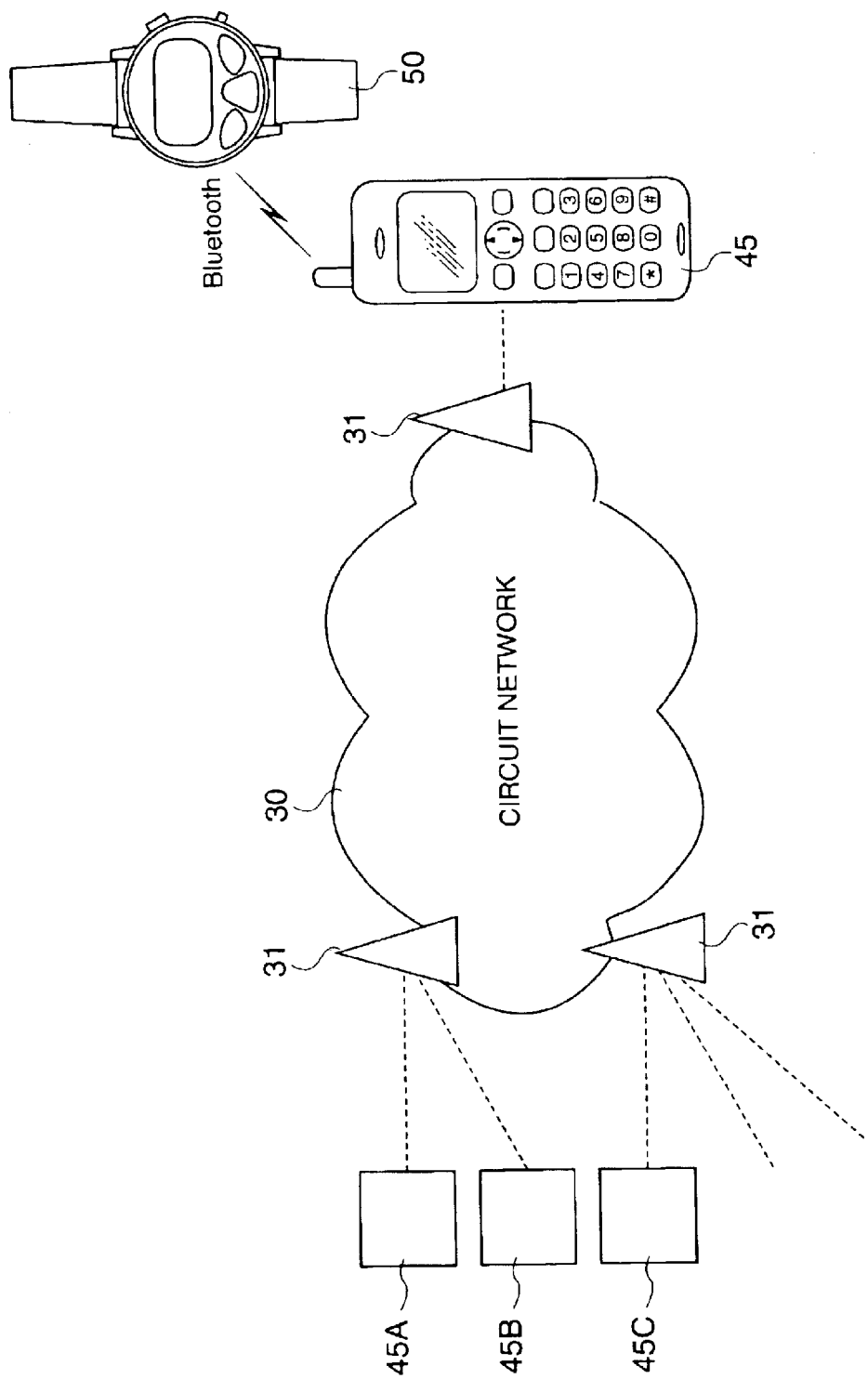
FIG. 13 shows the configuration of a wireless communication system according to a fifth embodiment of the present invention.

FIG. 13 is a configuration diagram of a wireless communication system comprising the present invention applied to a wristwatch as a portable data device (referred to below as simply a wristwatch) 50.

As shown in FIG. 13, this system comprises a wristwatch 50, a portable terminal 45 held by the user of the wristwatch 50, and other portable terminals 45A, 45B, 45C, . . .

Each portable terminal 45, 45A, 45B, 45C is connectable to a circuit network 30 through a base station 31, and the portable terminals can connect to each other through the circuit network 30 or to a server not shown in the figures connected to the Internet or other network and the circuit network 30.

The wristwatch 50 here has a Bluetooth (™) based local wireless communication function for communicating with the portable terminal 45. In addition to a Bluetooth-based communication function, portable terminal 45 has a function for wireless communication with the circuit network 30.

Figure 14:
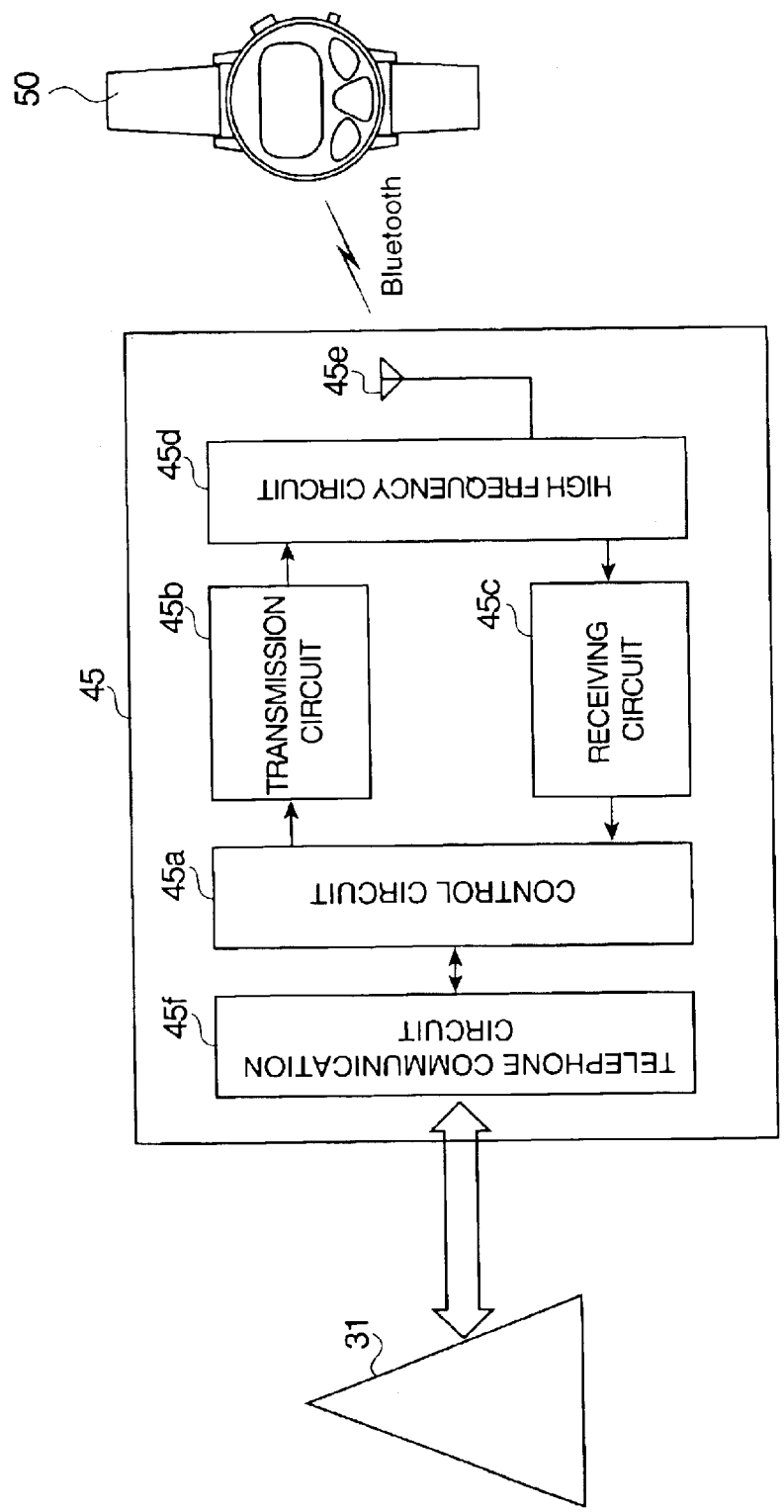
FIG. 14 is a block diagram showing the configuration of a portable terminal in the same system.

FIG. 14 shows the major configuration of the portable terminal 45.

As shown in FIG. 14, portable terminal 45 has a control circuit 45a for overall control of the portable terminal 45, a high frequency circuit 45d for receiving signals with the wristwatch 50 through an antenna 45e, a transmission circuit 45b for generating and outputting a transmission signal to the high frequency circuit 45d as controlled by the control circuit 45a, and a receiving circuit 45c for demodulating a received signal input from the high frequency circuit 45d and outputting received data to the control circuit 45a. The portable terminal 45 also has a telephone communication circuit 45f for telephone communication with the other portable terminals 45A, 45B, 45C, . . . through the circuit network 30.

The portable terminal 45 uses Bluetooth as the wireless communication protocol as noted above for wireless communication with the wristwatch 50. The frequency of signals output from the control circuit 45a is therefore 2.4 [GHz]. Furthermore, the wireless communication range for output signals from the portable terminal 45 is approximately 10 m (class 3 in the Bluetooth standard), and wireless communication with the wristwatch 50 is accomplished when the wristwatch 50 is within the range of this wireless communication distance.

The configuration of the wristwatch 50 is described next.

Figure 15:
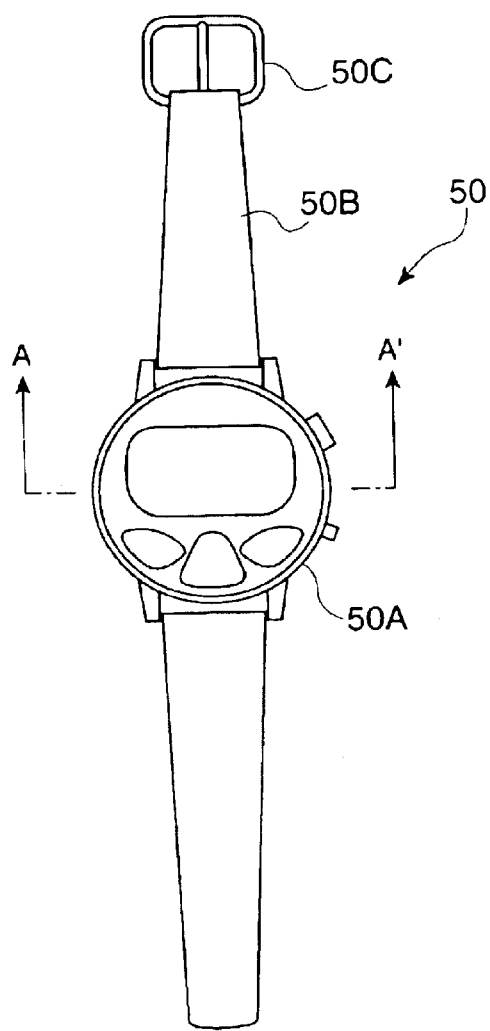
FIG. 15 shows the appearance of a wristwatch in the same system.

FIG. 15 shows the appearance of wristwatch 50. The wristwatch 50 has a wristwatch body 50A and a band 50B and buckle 50C for holding the wristwatch 50 on the user's wrist.

Figure 16:
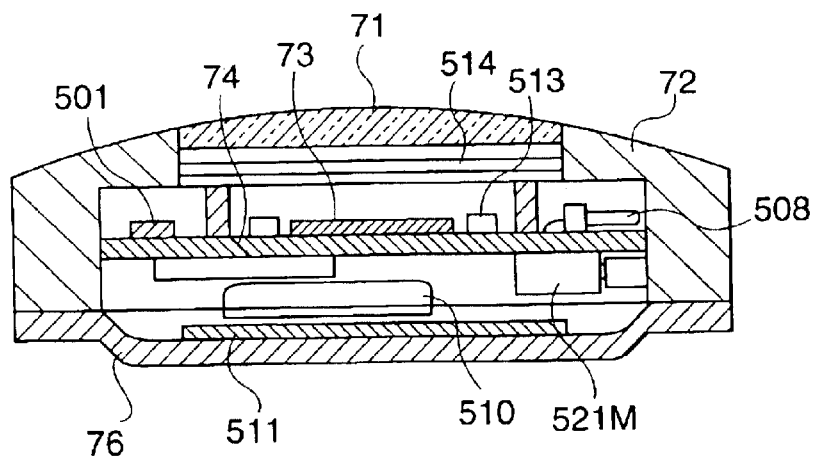
FIG. 16 is a section view of the same wristwatch.

FIG. 16 is a section view of the wristwatch body 50A through line A'13 A in FIG. 15.

As shown in FIG. 16 the wristwatch 50 has a bezel 71, case 72, and back cover 76, and inside the housing formed therefrom has an analog watch module 73 and circuit board 74.

A quartz oscillator 508 for generating a source signal with a reference frequency, and a battery 510 for supplying power to each part of the wristwatch 50, are disposed on the circuit board 74.

Also formed on the circuit board 74 are circuits for wireless communication, various circuits for driving buzzer 511 and vibrator 512 motor 521M, and antenna 501.

Figure 17:
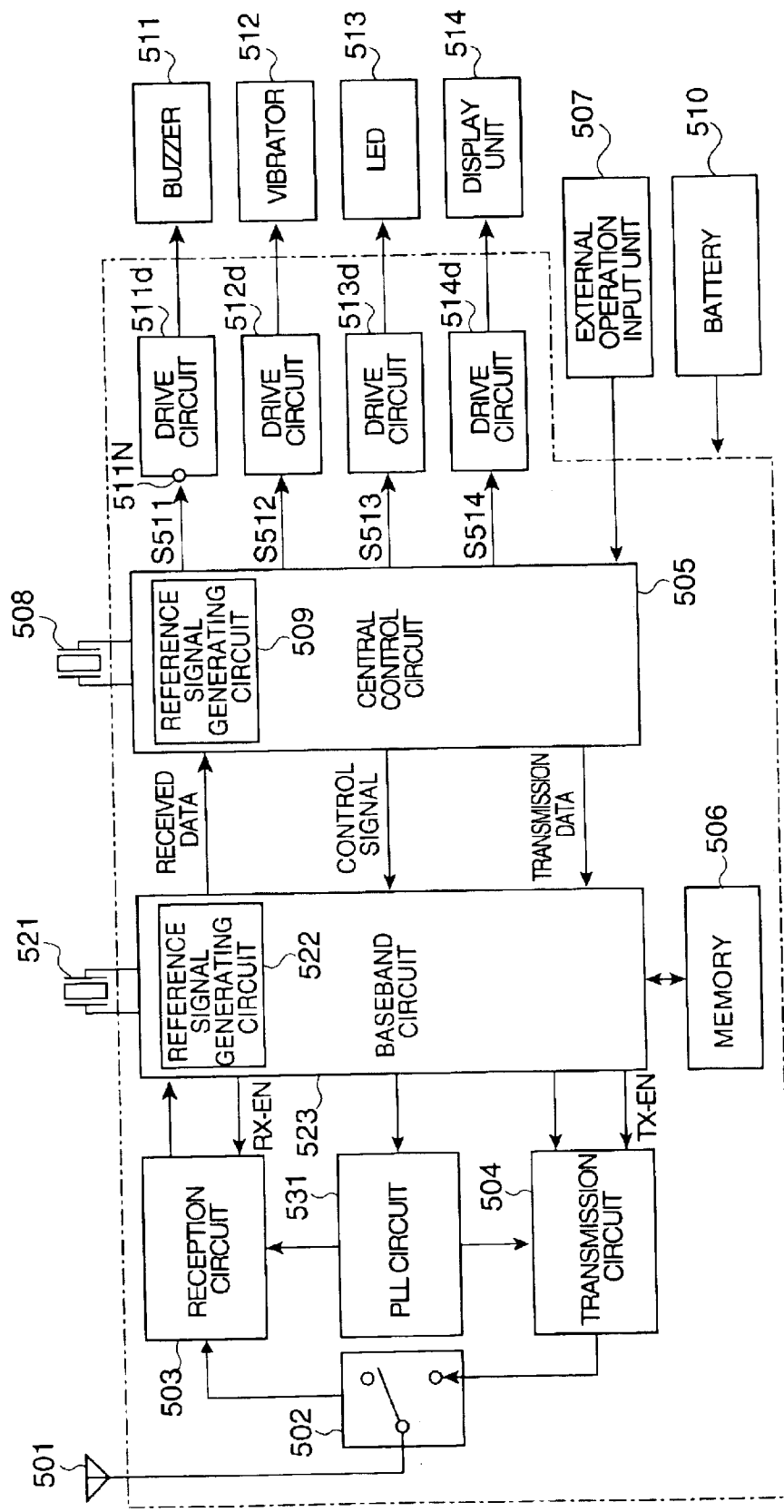
FIG. 17 is a block diagram showing the circuit configuration of the same wristwatch.

FIG. 17 is a block diagram showing the configuration of various circuits formed on the circuit board 74.

As shown in FIG. 17, a central control circuit 505 such as a CPU (Central Processing Unit), antenna 501, reception circuit 503, transmission circuit 504, switching circuit 502, PLL circuit 531, and baseband circuit 523 are mounted on the circuit board 74 of wristwatch 50. The switching circuit 502 alternately switches the connection of antenna 501 between reception circuit 503 and transmission circuit 504. The reception circuit 503, transmission circuit 504, switching circuit 502, and PLL circuit 531 form a wireless communication function unit for processing the Bluetooth RF layer. The baseband circuit 523 processes the Bluetooth baseband layer in the output data DRX of reception circuit 503 to output the received data to the central control circuit 505, and applies Bluetooth baseband layer processing to transmission data supplied from the central control circuit 505 to send the resulting data DTX to the transmission circuit 504.

The operating status of reception circuit 503 and transmission circuit 504 is controlled by the central control circuit 505. More specifically, when a high level signal RX-EN is supplied from the central control circuit 505 through baseband circuit 523, a specific drive voltage is supplied and the reception circuit 503 enters an operating mode. When a low level signal RX-EN is supplied, drive voltage is not supplied and the reception circuit 503 enters a non-operating mode.

Furthermore, when a high level signal TX-EN is supplied from the central control circuit 505 through baseband circuit 523, drive voltage is supplied and the transmission circuit 504 enters an operating mode. When a low level signal TX-EN is supplied, the specific drive voltage is not supplied and the transmission circuit 504 enters a non-operating mode.

The wristwatch 50 also has a buzzer 511 driven by drive circuit 511d for reporting various information to the user by means of a buzzer sound; a vibrator 512 driven by drive circuit 512d for reporting various information to the user by means of vibration; a light emitting unit 513 driven by drive circuit 513d and having an LED (Light Emitting Diode) or EL (Electronic Luminescent) backlight for reporting various information to the user by means of light; and a display unit 514 driven by drive circuit 514d and having a liquid crystal display, for example, for displaying various information.

The drive circuit 511d and buzzer 511, drive circuit 512d and vibrator 512, drive circuit 513d and light emitting unit 513, and drive circuit 514d and display unit 514 function as separate function units.

When, for example, a backlight with an EL element is used as the light emitting unit 513, an ac supply voltage of approximately 20 V is required to drive the EL backlight. A step-up circuit is therefore disposed to the drive circuit 513d of the light emitting unit 513, but this step-up circuit is also a factor producing electromagnetic noise.

The wristwatch 50 also has an external operation input unit 507 comprising buttons or a touch panel, for example, enabling various user operations; oscillators 508 and 521 for generating a source signal with a reference frequency; reference signal generating circuits 509, 522 for generating and outputting various reference signals based on the source signals; nonvolatile memory 506 for storing data; and battery 510 for supplying the required power to each part of the wristwatch 50.

In this embodiment of the invention power is supplied from the battery 510 directly to the various circuits of the wristwatch 50, but a separate constant voltage circuit (not shown in the figure) could be provided to supply power from the battery 510 to each circuit through the constant voltage circuit.

The central control circuit 505 also has a built-in encryption circuit for encrypting data sent and received with the high frequency circuit 45d in order to provide data security.

The memory 506 is EEPROM or flash memory, for example.

Figure 18:
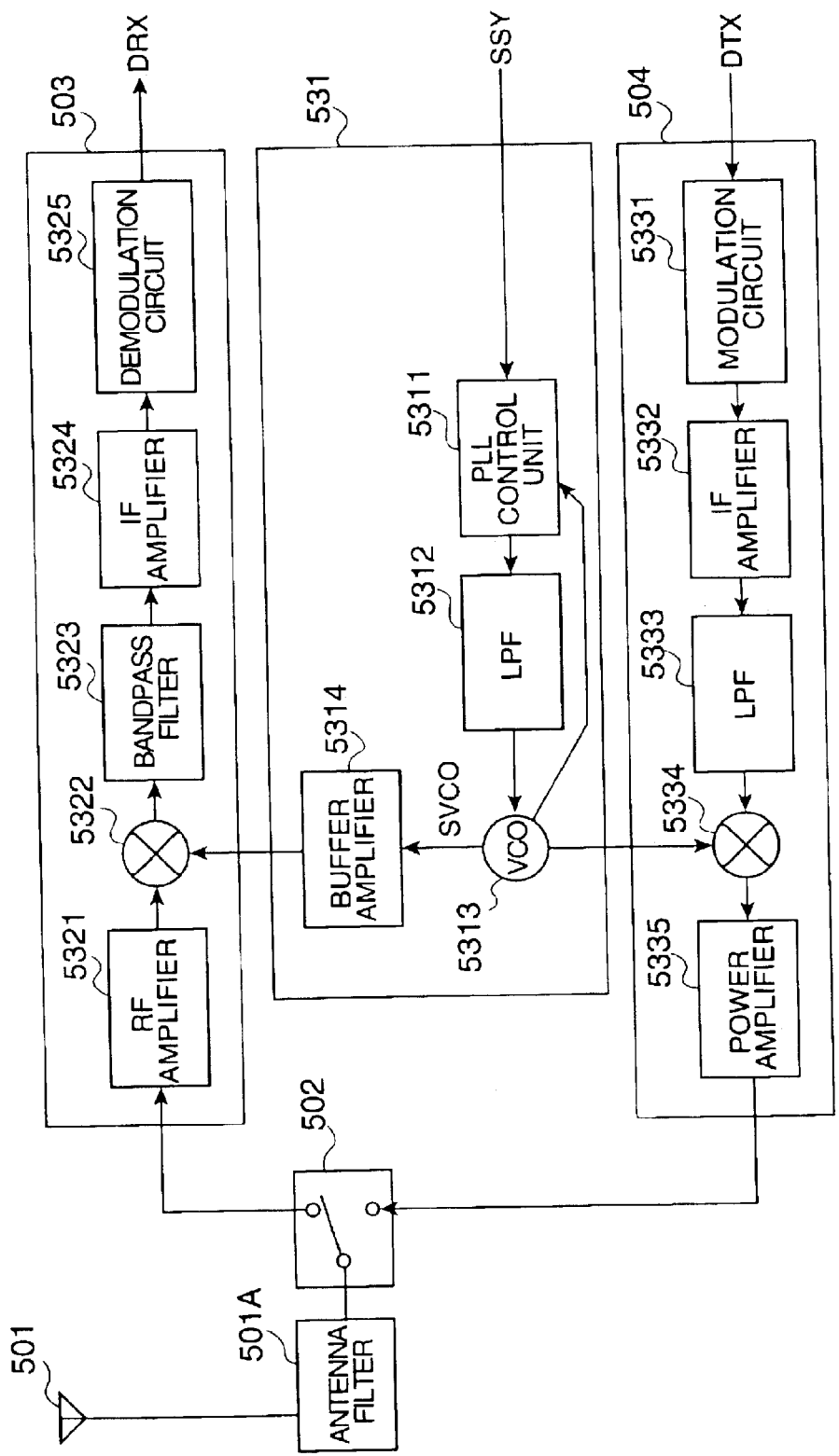
FIG. 18 is a block diagram showing in detail the PLL circuit, receiver circuit, and transmission circuit of the same wristwatch.

The detailed configuration of antenna 501, PLL circuit 531, reception circuit 503, and transmission circuit 504 is shown in FIG. 18.

The antenna 501 is connected through antenna filter 501A to the switching circuit 502 for switching sending and receiving in half-duplex two-way communication. When the wristwatch 50 transmits, the switching circuit 502 connects the antenna filter 501A to the output terminal of power amplifier 5335, and during reception connects the antenna filter 501A to the input terminal of RF amplifier 5321.

PLL control unit 5311, low-pass filter 5312, and voltage control oscillator (VCO) 5313 form the PLL (Phase Locked Loop) circuit 531 generating oscillation signal SVCO. A synthesizer control signal SSY is supplied from baseband circuit 523 to the PLL control unit 5311. The frequency of oscillation signal SVCO is determined by this synthesizer control signal SSY. The baseband circuit 523 sequentially changes the synthesizer control signal SSY in order to temporally change the frequency of oscillation signal SVCO according to a specific FH pattern. Buffer amplifier 5314 amplifies and supplies the oscillation signal SVCO to the mixer 5322.

RF amplifier 5321, mixer 5322, bandpass filter 5323, IF amplifier 5324, and demodulation circuit 5325 form a reception circuit for accepting reception signals from the antenna 501 through antenna filter 501A and switching circuit 502, and demodulating received data DRX from this reception signal. More specifically, during reception the above-noted antenna filter 501A removes extraneous components from the reception signal of the antenna 501, and outputs only the necessary components through switching circuit 502 to the RF amplifier 5321. The RF amplifier 5321 amplifies and sends the reception signal to the mixer 5322. Oscillation signal SVCO, the frequency of which changes in time according to the FH pattern, is supplied to this mixer 5322. The mixer 5322 applies spectrum despreading to the received signal by mixing this oscillation signal SVCO with the reception signal from the RF amplifier 5321. The bandpass filter 5323 selects an IF (Intermediate Frequency) signal in an intermediate frequency band of the output signal of mixer 5322, and outputs to the IF amplifier 5324. The IF amplifier 5324 amplifies this IF signal and outputs to demodulation circuit 5325. The demodulation circuit 5325 demodulates the received data DRX, that is, the baseband signal, from the IF signal, and outputs to the baseband circuit 523.

The modulation circuit 5331, IF amplifier 5332, low-pass filter 5333, mixer 5334, and power amplifier 5335 form a transmission circuit for generating the transmission signal supplied to the switching circuit 502. More specifically, for transmission the modulation circuit 5331 modulates the carrier using the transmission data DTX supplied from baseband circuit 523, and outputs an IF signal. This IF signal is supplied to the mixer 5334 through IF amplifier 5332 and low-pass filter 5333. Oscillation signal SVCO, the frequency of which changes in time according to the FH pattern, is supplied to this mixer 5334. The mixer 5334 mixes this oscillation signal SVCO and the IF signal, applies FH spectrum spreading to the IF signal, and outputs the transmission signal, a high frequency signal. The power amplifier 5335 amplifies this high frequency signal and outputs to switching circuit 502. The antenna filter 501A receives the output signal from power amplifier 5335 through switching circuit 502, removes extraneous components therefrom, and outputs only the required components to the antenna 501.

Figure 19:
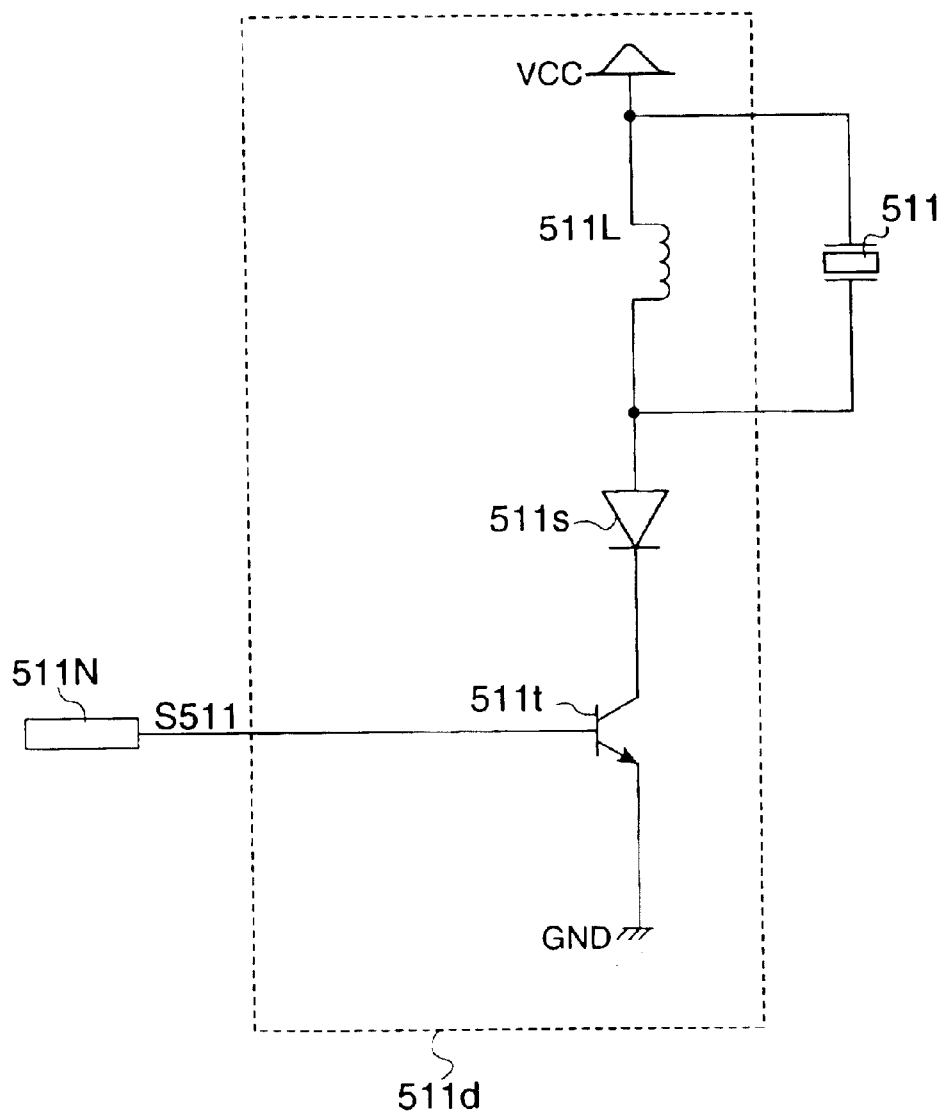
FIG. 19 is a circuit diagram showing the configuration of the drive circuit of the same wristwatch.

FIG. 19 shows the configuration of the drive circuit 511d and buzzer 511. A piezoelectric device is used as the buzzer 511 in this embodiment of the invention. When the voltage level of the input terminal 511N of drive circuit 511d is set to the supply voltage (VCC) level by central control circuit 505, current flows to the buzzer 511 and a buzzer sound with a specific frequency determined by coil 511L and the piezoelectric element is emitted from the buzzer 511.

Furthermore, it should be noted that drive circuit 511d for driving the buzzer 511 is shown in FIG. 19 but the same applies to the other drive circuits 512d, 513d, 514d, and each of the drive circuits 512d, 513d, 514d is driven/non-driven under the control of the central control circuit 505 and operation of the vibrator 512, light emitting unit 513, and display unit 514 is thus actually controlled.

(2) Operation of the Embodiment

When the buzzer 511 that is one of the functional units is driven during wireless communication in a wristwatch 50 according to this embodiment of the invention, electromagnetic noise produced from the buzzer 511 or a supply voltage drop accompanying driving the buzzer 511 has an adverse effect on data sent and received through the antenna 501, and normal wireless communication can be expected to not be possible. Furthermore, electromagnetic noise or a supply voltage drop produced when another functional part such as the vibrator 512 is driven during wireless communication does not adversely affect data sent and received through the antenna 501, and normal wireless communication can be expected to be assured.

Determining whether electromagnetic noise emitted from each functional unit or a supply voltage drop accompanying driving each functional unit will or will not adversely affect the operation of wireless communication is possible by considering such general factors as the position of the device (the piezoelectric element of the buzzer 511, for example) in each functional unit producing the electromagnetic noise, for example, relative to the antenna 501, and the amount of current flowing to the drive circuit when driving each functional unit.

Suppose that in the present embodiment it is determined from the results of test measurements of such elements that normal wireless communication is not possible when the buzzer 511 is driven.

Figure 20:
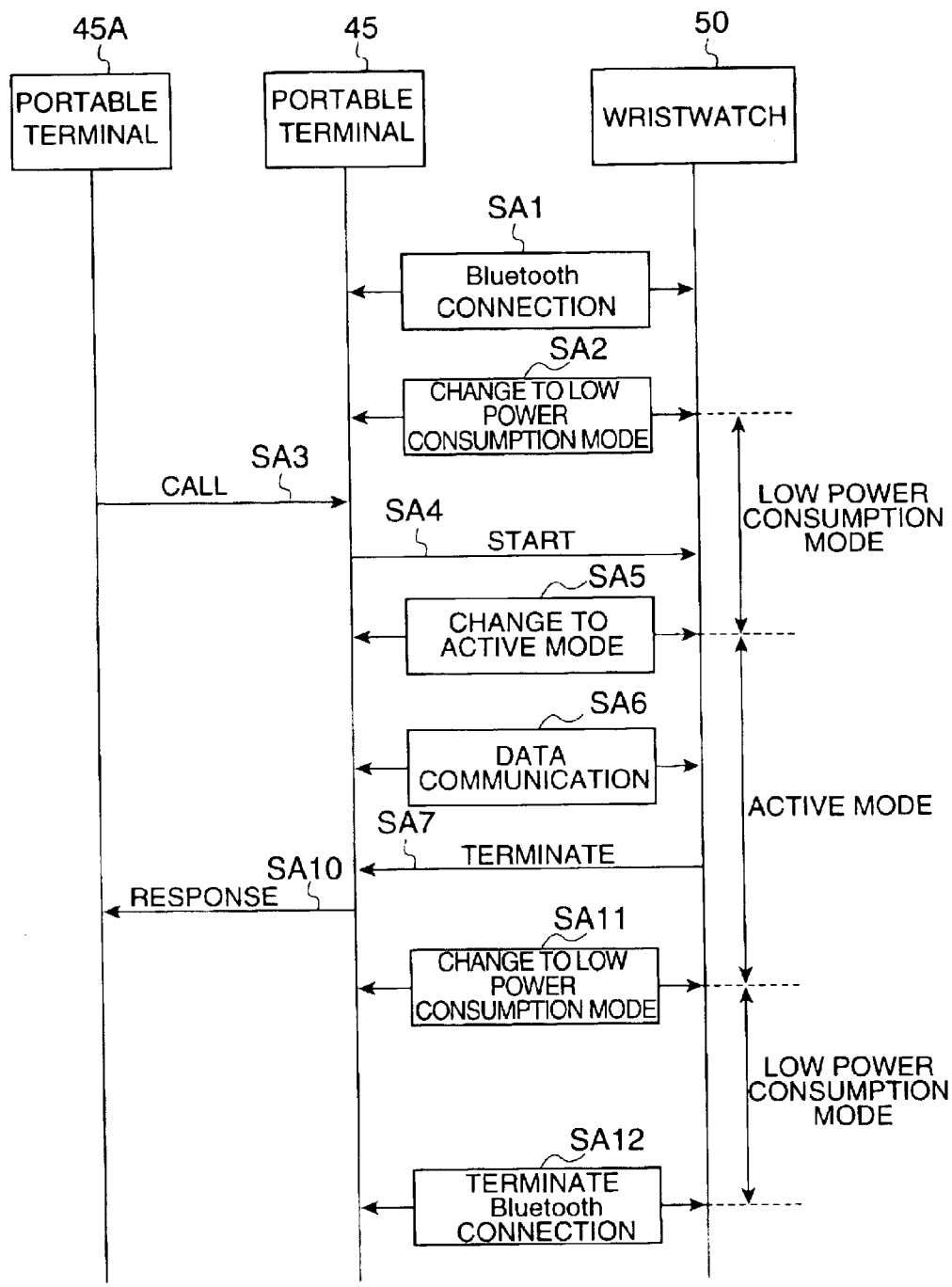
FIG. 20 is a sequence diagram showing the operation of the same wristwatch.

Operation of the present embodiment is described with reference to the timing chart in FIG. 20.

A software program for running a process establishing a network connection conforming to the Bluetooth standard (referred to below as simply a Bluetooth connection) between the portable terminal 45 and wristwatch 50 is pre-installed to the portable terminal 45 and wristwatch 50.

Furthermore, a software program for controlling prohibiting driving a functional unit according to the present invention is pre-installed to memory 506, which functions as the recording medium in the wristwatch 50.

In addition, when the user performs a specific operation on the external operation input unit 507 of the wristwatch 50, the wristwatch 50 runs a process for establishing a Bluetooth connection with the portable terminal 45, and a network called a "piconet" is formed between the wristwatch 50 and portable terminal 45.

After thus establishing a Bluetooth connection, the portable terminal 45 and wristwatch 50 enter a Bluetooth low power consumption mode. This low power consumption mode is assumed in the present embodiment to be the park mode.

A low power consumption mode is a state in which only synchronization signals (beacon signals) for maintaining the piconet established between the portable terminal 45 and wristwatch 50 are exchanged between the portable terminal 45 and wristwatch 50, and other actual data communication does not occur.

Specifically, the portable terminal 45 sends a synchronization signal (beacon signal) to the wristwatch 50. The wristwatch 50 sends a response signal to the received beacon signal to the portable terminal 45. The portable terminal 45 and wristwatch 50 perform this beacon signal receiving operation at a specific period (the beacon period; approximately 1.28 sec, for example), and when the beacon signal is not being exchanged perform the minimum internal processing required to maintain piconet synchronization.

Suppose then that another portable terminal 45A calls the portable terminal 45 (step SA3). In this case the portable terminal 45 must notify the wristwatch 50 that a call was received. The portable terminal 45 therefore sends a signal to change the Bluetooth connection between the portable terminal 45 and wristwatch 50 to the active mode (step SA4) in order to exchange actual data with the wristwatch 50. The central control circuit 505 of the wristwatch 50 receiving this signal switches from the low power consumption mode to the active mode, and prepares to receive data (step SA5).

The active mode is the mode in which data is exchanged between the portable terminal 45 and wristwatch 50. Data is sent and received every 625 $\mu$sec between the portable terminal 45 and wristwatch 50 in the active mode. In the present embodiment the portable terminal 45 notifies the wristwatch 50 when a call process is received from the portable terminal 45A, and the wristwatch 50 receiving this notice sends an acknowledgment that the notice was received to the portable terminal 45 (step SA6).

When this data communication ends (step SA7), portable terminal 45 and wristwatch 50 resume the low power consumption mode (step SA11) The wristwatch 50 then runs the process for exchanging the beacon signal with the portable terminal 45 to maintain piconet synchronization and stands by to enter the next active mode.

If the wristwatch 50 and portable terminal 45 become positioned out of the wireless communication range, it is no longer possible to exchange beacon signals to maintain piconet synchronization. In this case the Bluetooth connection established between the wristwatch 50 and portable terminal 45 is broken (step SA12).

Specific operating content is described next with reference primarily to the wristwatch 50.

The wristwatch 50 enters the low power consumption mode when it establishes a Bluetooth connection with the portable terminal 45 in the present embodiment, and thereafter runs a process for maintaining the low power consumption mode until the wristwatch 50 receives a signal from the portable terminal 45 for switching to the active mode. The wristwatch 50 will not autonomously run a process for switching from the low power consumption mode to the active mode.

More specifically, the relationship between the portable terminal 45 and wristwatch 50 according to this embodiment of the invention is predicated upon the portable terminal 45 always being the master device and the wristwatch 50 always being a slave device.

In the low power consumption mode the wristwatch 50 determines at a specific timing interval whether it was able to receive a synchronization signal (beacon signal) output from the antenna 45e of the portable terminal 45.

Driving the 51 is prohibited before the specified timing for receiving the synchronization signal. Then, after the specified synchronization signal receiving period has passed, the driving prohibition of buzzer 511 is cancelled. Driving the buzzer is likewise prohibited during the specific period including the period for sending a response signal terminal the synchronization signal.

To describe this more specifically, the control circuit 45a of portable terminal 45 controls the transmission circuit 45b to generate a beacon signal at the specified timing, and said beacon signal continues to be output through the high frequency circuit 45d and antenna 45e to a specific external communication range.

When the wristwatch 50 is located in the communication range of the portable terminal 45, beacon signals output from the portable terminal 45 are input to the reception circuit 503 through the antenna body 501B of the antenna 501, antenna filter 501A, and switching circuit 502.

The central control circuit 505 here supplies a high level signal RX-EN to the reception circuit 503 according to the timing at which the beacon signal is supplied to the reception circuit 503, setting the reception circuit 503 to an operating state. The switching circuit 502 is also controlled so that signals from the antenna 501 are output to the reception circuit 503.

As a result, the reception data DRX is demodulated by the reception circuit 503 from the signal received from the antenna 501, and supplied through baseband circuit 523 to the central control circuit 505.

When received data equivalent to a beacon signal from the portable terminal 45 is thus obtained, the central control circuit 505 determines that the Bluetooth connection with the portable terminal 45 is sustained.

Furthermore, when reception data DRX is supplied from the reception circuit 503 to the baseband circuit 523, central control circuit 505 sends a low level signal RX-EN to the reception circuit 503 and thus sets the reception circuit 503 to a non-operating mode. The central control circuit 505 thus provides control so that more than necessary power is not consumed by the reception circuit 503.

The central control circuit 505 then outputs transmission data DTX responding to the received beacon signal through the baseband circuit 523 to transmission circuit 504.

Furthermore, to make the transmission circuit 504 process the transmission data DTX responding to the beacon signal, the central control circuit 505 sends a high level signal TX-EN to the transmission circuit 504 according to the timing at which the transmission data DTX is supplied to the transmission circuit 504, and thus sets the transmission circuit 504 to an operating mode. It also controls the switching circuit 502 so that the signal output from transmission circuit 504 is supplied to the antenna 501.

As a result, the transmission circuit 504 modulates the carrier using the transmission data DTX, applies FH spectrum spreading to this modulated wave, and the transmission signal thus obtained is output from antenna 501.

Furthermore, after the transmission signal is output from transmission circuit 504 to switching circuit 502,( the central control circuit 505 sends a low level signal TX-EN to the transmission circuit 504, setting the transmission circuit 504 to a non-operating mode. The central control circuit 505 thus also provides control so that more than necessary power is not consumed by the transmission circuit 504.

When a response signal RES output from the wristwatch 50 is thus received by the portable terminal 45, the portable terminal 45 side also confirms that the Bluetooth connection established with the wristwatch 50 is sustained, and after a specified synchronization period has passed applies control to send the next beacon signal to the wristwatch 50.

Figure 21:
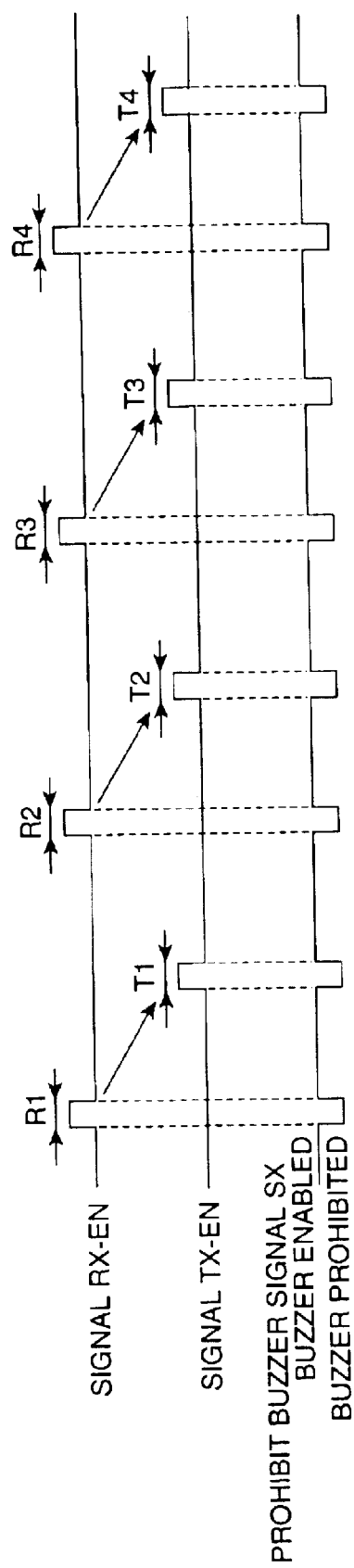
FIG. 21 and FIG. 22 are timing charts showing the operating content of the same wristwatch.

FIG. 21 is a timing chart showing the content of operation associated with wireless communication with the portable terminal 45 in the wristwatch 50 set to a low power consumption mode.

In FIG. 21 period R1 is a specific period including the period in which a beacon signal is received from the portable terminal 45, and period T1 is a specific period including the period in which a response signal to the beacon signal received in period R1 is sent to the portable terminal 45. Period R1 here is equivalent to the period in which a high level signal RX-EN is supplied to the reception circuit 503 as controlled by the central control circuit 505. Furthermore, period T1 is equivalent to the period in which a high level signal TX-EN is supplied to the transmission circuit 504 under the control of the central control circuit 505.

In addition, period R2 is a specific period including the period for receiving the next beacon signal, and period T2 is a specific period including the period in which the response signal to the beacon signal received in period R2 is sent. Periods R3, T3, R4, T4, . . . are the same.

Referring to FIG. 21 the central control circuit 505 of wristwatch 50 applies control so that the buzzer 511 is not driven in each period R1, R2, . . . , T1, T2, . . . That is, control prevents driving the buzzer 511 while a high level signal RX-EN is supplied to the wristwatch 50 and while a high level signal TX-EN is supplied to the transmission circuit 504.

Prohibit buzzer signal SX shown in FIG. 21 indicates the control content of this central control circuit 505; the central control circuit 505 forces the input terminal 511N of buzzer drive circuit 511d low and prohibits driving by the buzzer drive circuit 511d while the prohibit buzzer signal SX is low.

Because the buzzer 511 is thus not driven in a wristwatch 50 in the low power consumption mode when receiving the beacon signal and when sending a response signal to the beacon signal, wireless communication can proceed normally. Furthermore, because driving the buzzer 511 is prohibited in the low power consumption mode only in a specific period including a wireless communication period, buzzer 511 functionality is also not limited more than necessary.

When the wristwatch 50 is in an active mode, data sending and receiving with the portable terminal 45 occurs frequently (in 625 μsec units). Operation of the wristwatch 50 for exchanging data with the portable terminal 45 is the same in the active mode as described above in the low power consumption mode.

That is, signals output from the antenna 45e of portable terminal 45 are received from antenna 501, and the central control circuit 505 evaluates the received signal content and sends a response signal to the received signal from antenna 501 to the portable terminal 45.

The central control circuit 505 also controls switching the level of signal RX-EN supplied to the reception circuit 503 when in the active mode, and the reception circuit 503 is in the operating mode while signals output from the portable terminal 45 are supplied through the antenna 501 to the reception circuit 503.

Furthermore, the central control circuit 505 also controls level switching for signal TX-EN supplied to the transmission circuit 504, and the transmission circuit 504 is set to the operating mode in the period in which signals to be sent to the portable terminal 45 from the baseband circuit 523 are supplied to the transmission circuit 504.

Figure 22:
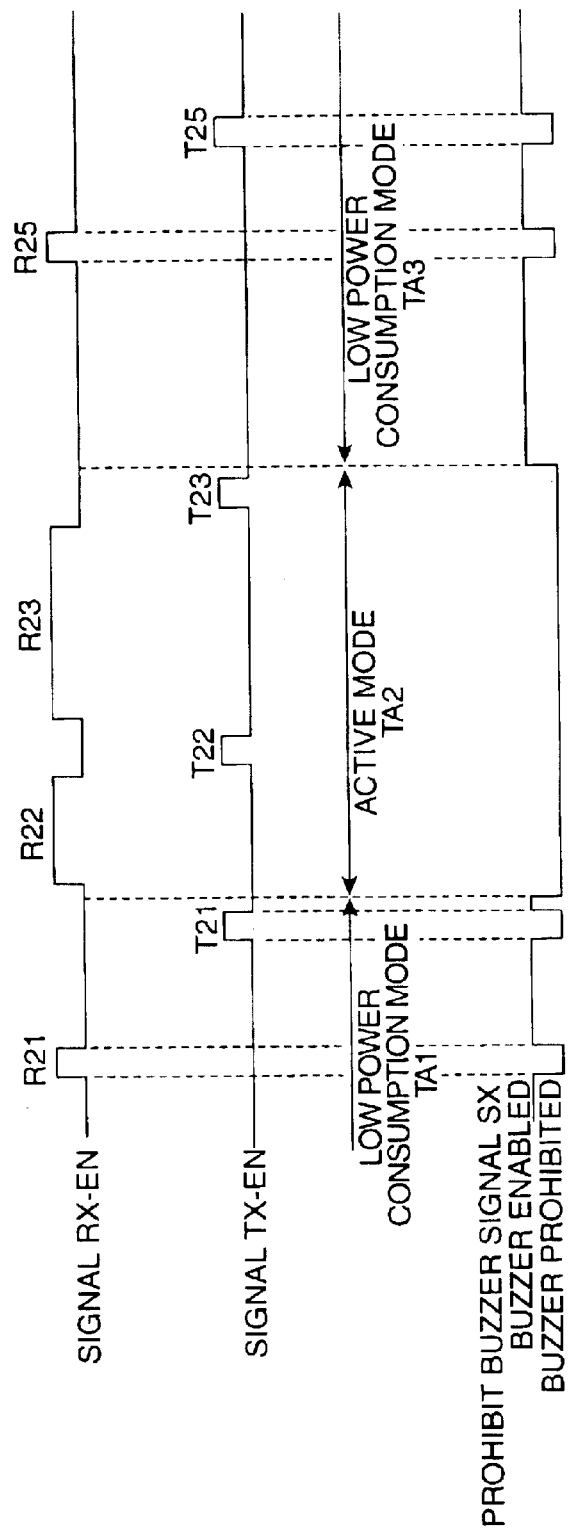

FIG. 22 shows the content of operation related to wireless communication with the portable terminal 45 when the wristwatch 50 shifts from a low power consumption mode to the active mode and again to the low power consumption mode.

In period TA1 in the low power consumption mode, the central control circuit 505 of wristwatch 50 forces input terminal 511N of buzzer 511 drive circuit 511d low, applying control so that the buzzer 511 is not driven, in period R21 corresponding to the period for receiving beacon signals sent from the portable terminal 45, and period T21 corresponding to the period for sending a response signal to the received beacon signal to the portable terminal 45.

That is, the central control circuit 505 applies control so that the buzzer 511 is not driven in the period where a high level signal RX-EN is supplied to the reception circuit 503 or the period where a high level signal TX-EN is supplied to the transmission circuit 504.

Next, in the active mode period TA2 the wristwatch 50 frequently sends and receives specific packet data with the portable terminal 45. In FIG. 22 the wristwatch 50 receives data from portable terminal 45 in period R22, and in period T22 sends response data to the received data to the portable terminal 45. In period R23 the next data is received from the portable terminal 45, and in period T23 response data to the received data is sent to the portable terminal 45.

In such an active mode period TA2 the central control circuit 505 of wristwatch 50 forces the input terminal 511N of buzzer 511 drive circuit 511d low and thus provides control so that driving buzzer 511 is prohibited throughout the entire period TA2.

In the next low power consumption mode period TA3, the central control circuit 505 of wristwatch 50 forces input terminal 511N of buzzer 511 drive circuit 511d low, applying control so that the buzzer 511 is not driven, in period R25 for receiving beacon signals sent from the portable terminal 45, and period T25 corresponding to the period for sending a response signal to the received beacon signal to the portable terminal 45.

The prohibit buzzer signal SX shown in FIG. 22 indicates the control content of the central control circuit 505 shown above. While the prohibit buzzer signal SX is low, the central control circuit 505 forces the input terminal 511N of buzzer drive circuit slid low and thus prohibits driving buzzer drive circuit 511d.

The buzzer 511 is not driven throughout the entire active mode (period TA2), and wireless communication is therefore assured to be normal.

Figure 23:
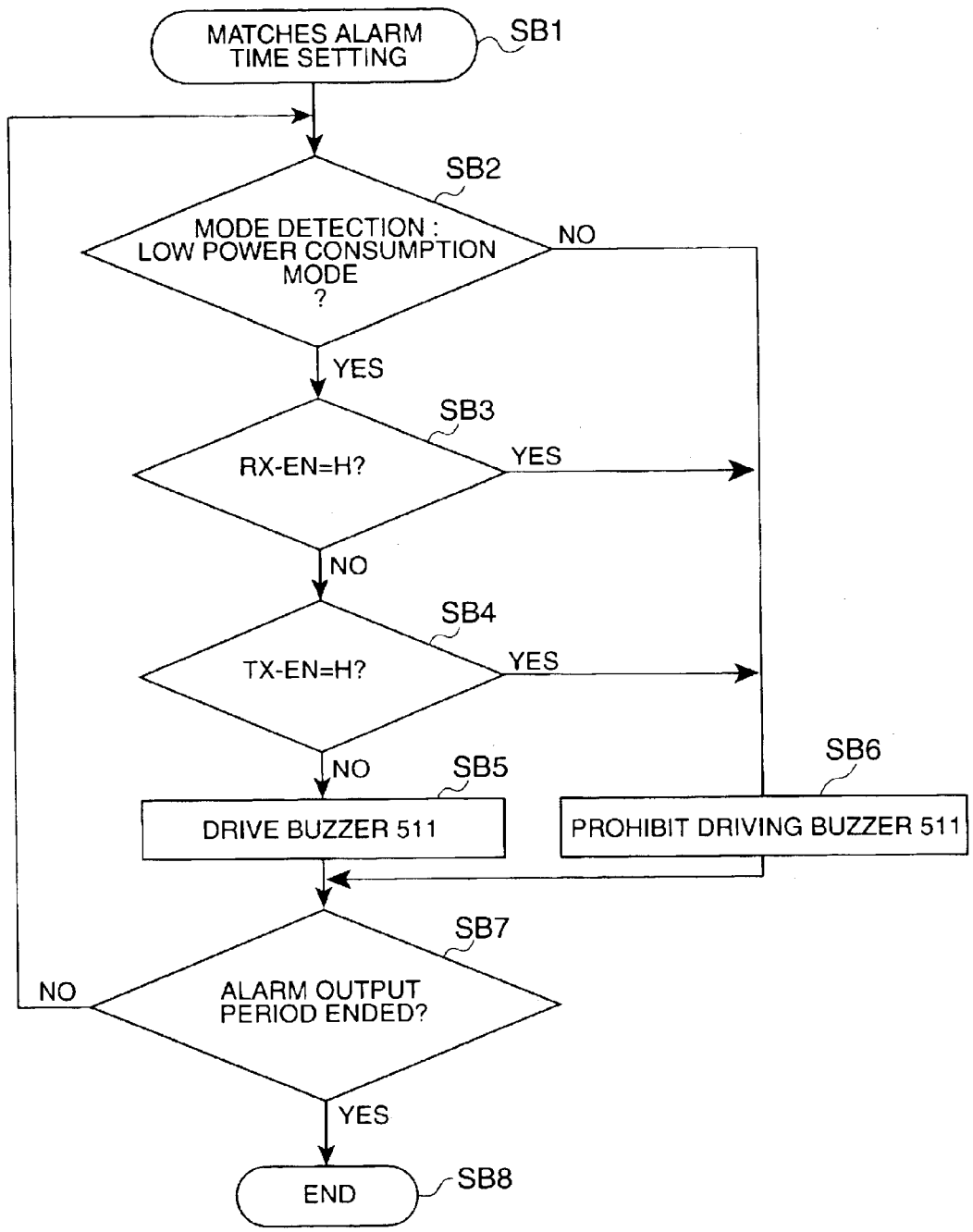
FIG. 23 is a flow chart showing the control content of the central control circuit of the same wristwatch.

FIG. 23 is a flow chart showing the content of a program run by the central control circuit 505 of the wristwatch 50 to drive the buzzer 511.

If the set alarm time matches the current time (step SB1), the central control circuit 505 determines whether the wristwatch 50 is set to a Bluetooth low power consumption mode in relation to the portable terminal 45 (step SB2). If not in a low power consumption mode, an active mode is detected (step SB2: no) and control prohibiting driving buzzer 511 is applied (step SB6).

If a low power consumption mode is detected (step SB2: yes), the central control circuit 505 determines whether the wristwatch 50 is in a specific period including a period receiving a synchronization signal (beacon signal) from the portable terminal 45 (step SB3), or is in a specific period including a period sending a response signal to the received synchronization signal (step SB4). More specifically, the central control circuit 505 detects whether it is a period for supplying a high level signal RX-EN to the reception circuit 503 or a period for supplying a high level signal TX-EN to the transmission circuit 504.

If a high level signal is being supplied to the reception circuit 503 or transmission circuit 504 (step SB3: yes, or step SB4: yes), control is applied prohibiting driving the buzzer 511 (step SB6) On the other hand, if a high level signal RX-EN or signal TX-EN is not being supplied to the reception circuit 503 and transmission circuit 504 (step SB3: no, or step SB4: no), the central control circuit 505 causes driving the buzzer 511 (step SB6).

Figure 24:
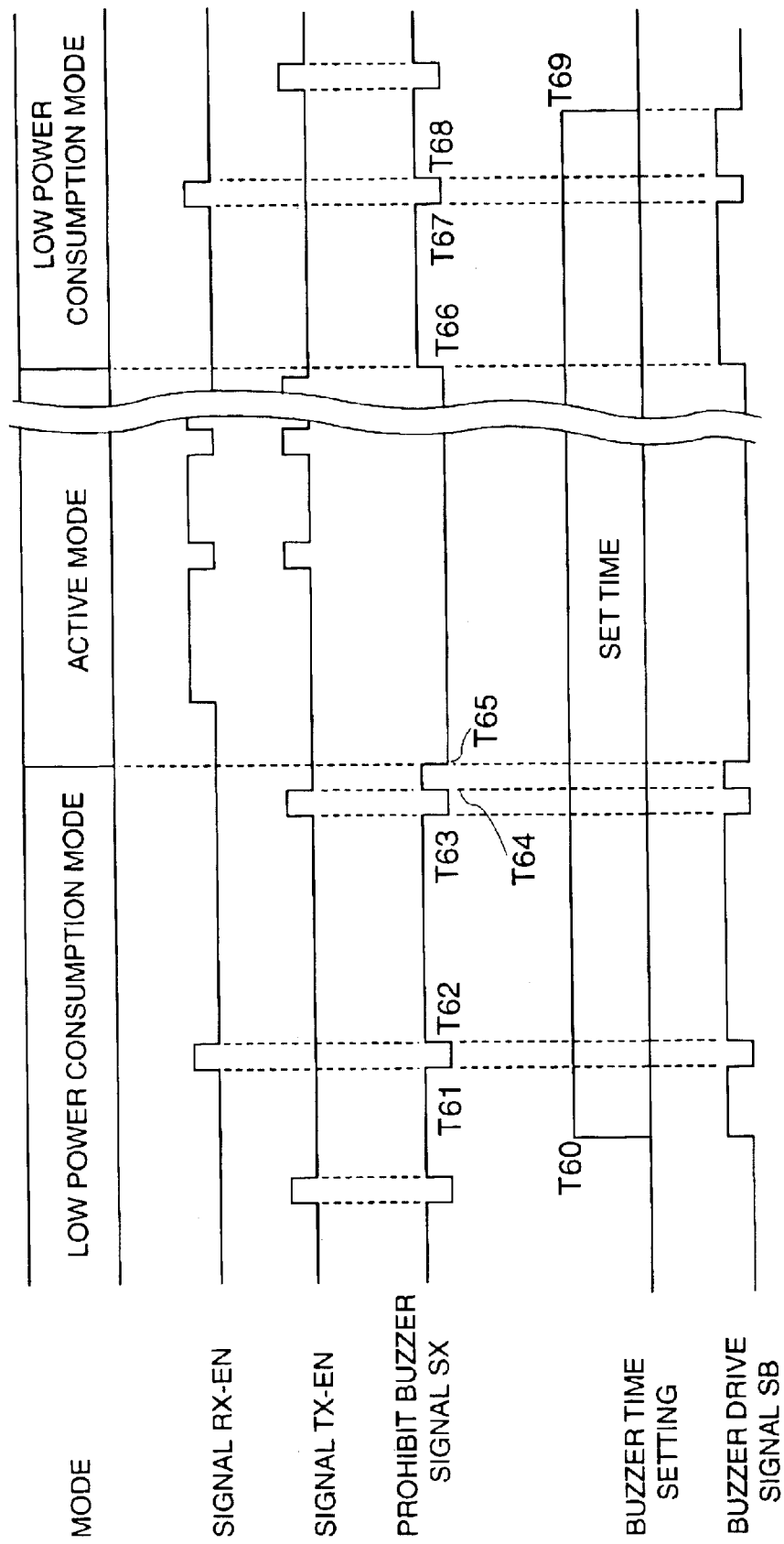
FIG. 24 is a timing chart showing operation of the same wristwatch.

FIG. 24 shows the above operation in a time chart.

Suppose that the period from time T60 to time T69 is set as the set alarm time.

A process corresponding to the flow chart in the above-noted FIG. 23 is run when the central control circuit 505 detects at time T60 that the current time matches the set alarm time, but because the low power consumption mode is set and wireless data is not being sent and received at time T60, it begins driving the buzzer 511.

Thereafter the central control circuit 505 continues to run a process corresponding to the flow in FIG. 23. Then, because from time T61 to time T62 corresponding to a period in which a beacon signal is received from the portable terminal 45, the central control circuit 505 supplies a high level signal RX-EN to the reception circuit 503. As a result, the central control circuit 505 prohibits driving the buzzer 511. Driving the buzzer 511 is likewise prohibited from time T63 to time T64, and in the period from time T61 to time T62.

When the wristwatch 50 is in the low power consumption mode, the central control circuit 505 thus applies control prohibiting driving buzzer 511 only when the wristwatch 50 is communicating wireless data. Therefore, when the wristwatch 50 is in the low power consumption mode and wirelessly communicating a synchronization signal (beacon signal) with the portable terminal 45, said wireless communication will not be interfered with by driving the buzzer 511.

When the wristwatch 50 then shifts to the active mode at time T65 due to a request from portable terminal 45, the central control circuit 505 prohibits driving the buzzer 511. The central control circuit 505 then prohibits driving the buzzer 511 in the period from time T65 to time T66 when the wristwatch 50 is in the active mode.

The central control circuit 505 thus control prohibiting driving the buzzer 511 at all times when the wristwatch 50 is in the active mode. Therefore, even if the wristwatch 50 in the active mode frequently exchanges data with the portable terminal 45 by wireless communication, said wireless communication will not be interfered with by driving the buzzer 511.

When the wristwatch 50 ends data communication with the portable terminal 45 at time T66, the wristwatch 50 resumes the low power consumption mode.

The control content of the central control circuit 505 is the same as described above when the low power consumption mode is selected, and control prohibits driving the buzzer 511 only in the specific period (the period from time T67 to time T68) including the period in which the wristwatch 50 is wirelessly communicating data.

The central control circuit 505 then determines at time T69 that the time setting of the buzzer 511 is over, and ends the flow in FIG. 23.

As described above, a wristwatch 50 according to this embodiment of the invention prohibits driving the buzzer 511 at least while the wristwatch 50 is wirelessly communicating data with the portable terminal 45.

As a result, because the buzzer 511 does not operate during wireless communication, a sudden drop in the supply voltage due to driving the buzzer 511 is prevented, and wireless communication can be reliably accomplished.

F: Sixth Embodiment

The system configuration and operating content of this embodiment of the invention is the same as in the above-noted fifth embodiment, and the same symbols as above are therefore used in the figures. Only the differences are described below.

In the above fifth embodiment the central control circuit 505 controls prohibiting driving the buzzer 511, which can lead to a sudden supply voltage drop, during wireless communication.

In the present embodiment also the central control circuit 505 provides control to prevent the output voltage of battery 510 dropping below a specific level and the power required by the circuits for wireless communication not being supplied during wireless communication.

When the vibrator 512 is driven in the present embodiment current of 10 mA or more flows in the circuit board 74, and if the vibrator 512 is driven during wireless communication it may not be possible to supply sufficient power to the wireless communication circuits, and normal wireless communication may not be possible.

To resolve this problem a wristwatch 50 according to this embodiment of the invention controls driving the vibrator 512 during wireless communication only when the output voltage of battery 510 exceeds a specified level. A battery voltage detection circuit 90 for determining the output voltage of battery 510 is therefore provided.

Figure 25:
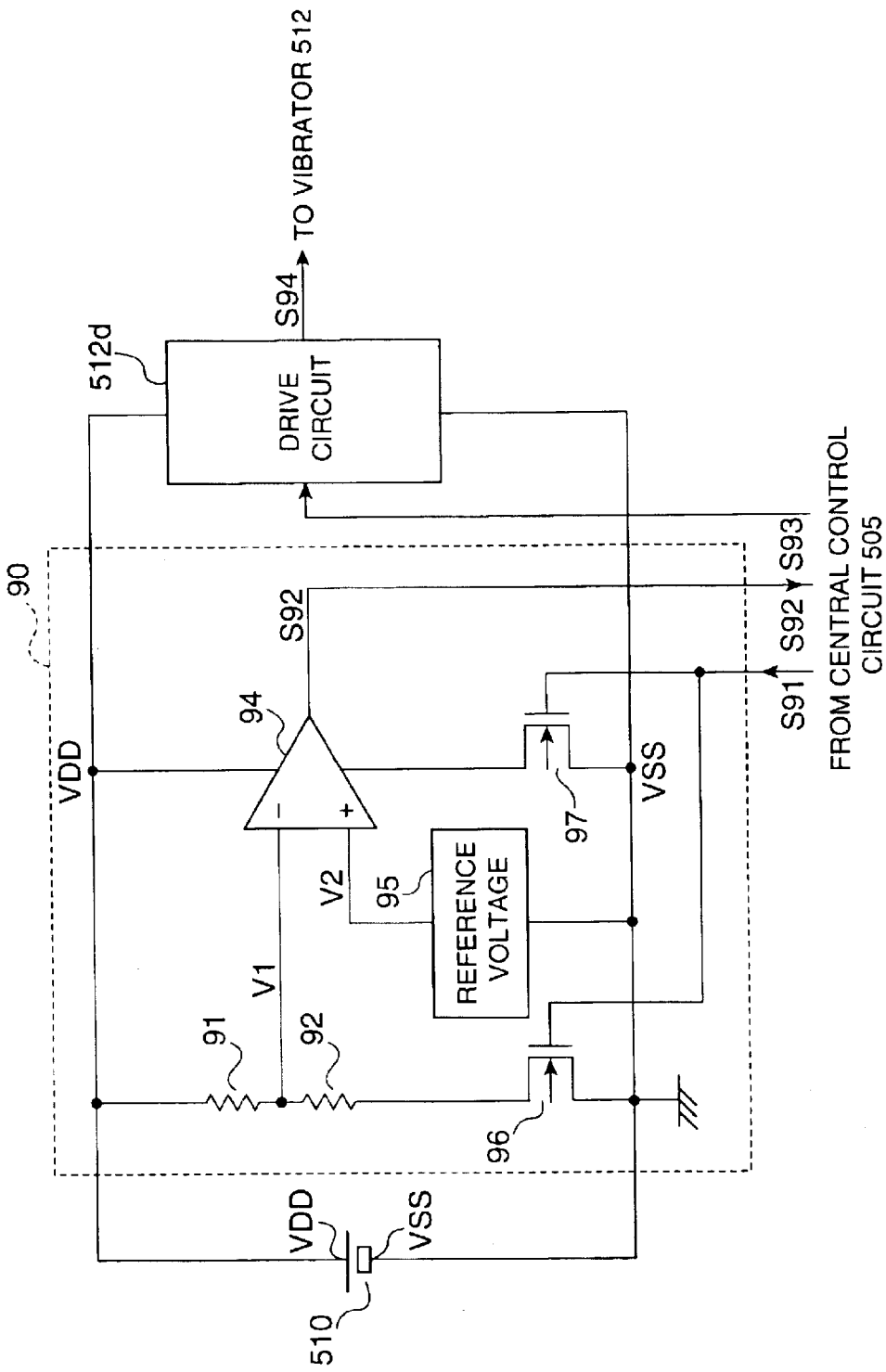
FIG. 25 is a circuit diagram showing the configuration of a battery voltage determination circuit in a sixth embodiment of the present invention.

FIG. 25 shows the configuration of this battery voltage detection circuit 90 by way of example.

The battery voltage detection circuit 90 operates when a high level control signal S91 is supplied from central control circuit 505. This control signal S91 is supplied to transistors 96, 97 of the battery voltage detection circuit 90.

Transistors 96, 97 are n-channel MOS transistors, turn on when a high level signal is applied to the gate terminal, and are otherwise off.

Resistances 91, 92 form a voltage dividing circuit; when transistor 96 is on, this voltage dividing circuit outputs the voltage-divided voltage level V1 of the battery 510 output voltage.

Reference voltage generating circuit 95 is a circuit for generating signal V2 with a specific voltage level. In this embodiment of the invention reference voltage generating circuit 95 outputs the allowable minimum voltage V2 of the voltage-divided level V1 of the battery 510 output voltage. When the voltage-divided level V1 of the battery 510 output voltage is greater than allowable minimum voltage V2, supplying power sufficient for the wireless communication circuits is assured regardless of driving the vibrator 512.

This allowable minimum voltage is pre-determined from tests, for example.

The comparator 94 compares the negative input terminal voltage V1 with the positive input terminal voltage V2, outputs a low level result signal S92 when voltage V1 is greater than voltage V2, and outputs a high level result signal S92 when voltage V1 is lower than voltage V2.

Under the control of central control circuit 505, drive circuit 512d outputs drive signal S94 for driving the vibrator 512.

When a low level control signal S93 is supplied from the central control circuit 505, drive circuit 512d outputs a drive signal S94 for driving the vibrator 512. When a high level control signal S93 is supplied, drive circuit 512d does not output drive signal S94 to the vibrator 512, and driving the vibrator 512 stops in this case.

The specific operation of the drive circuit 512d is described below.

Figure 26:
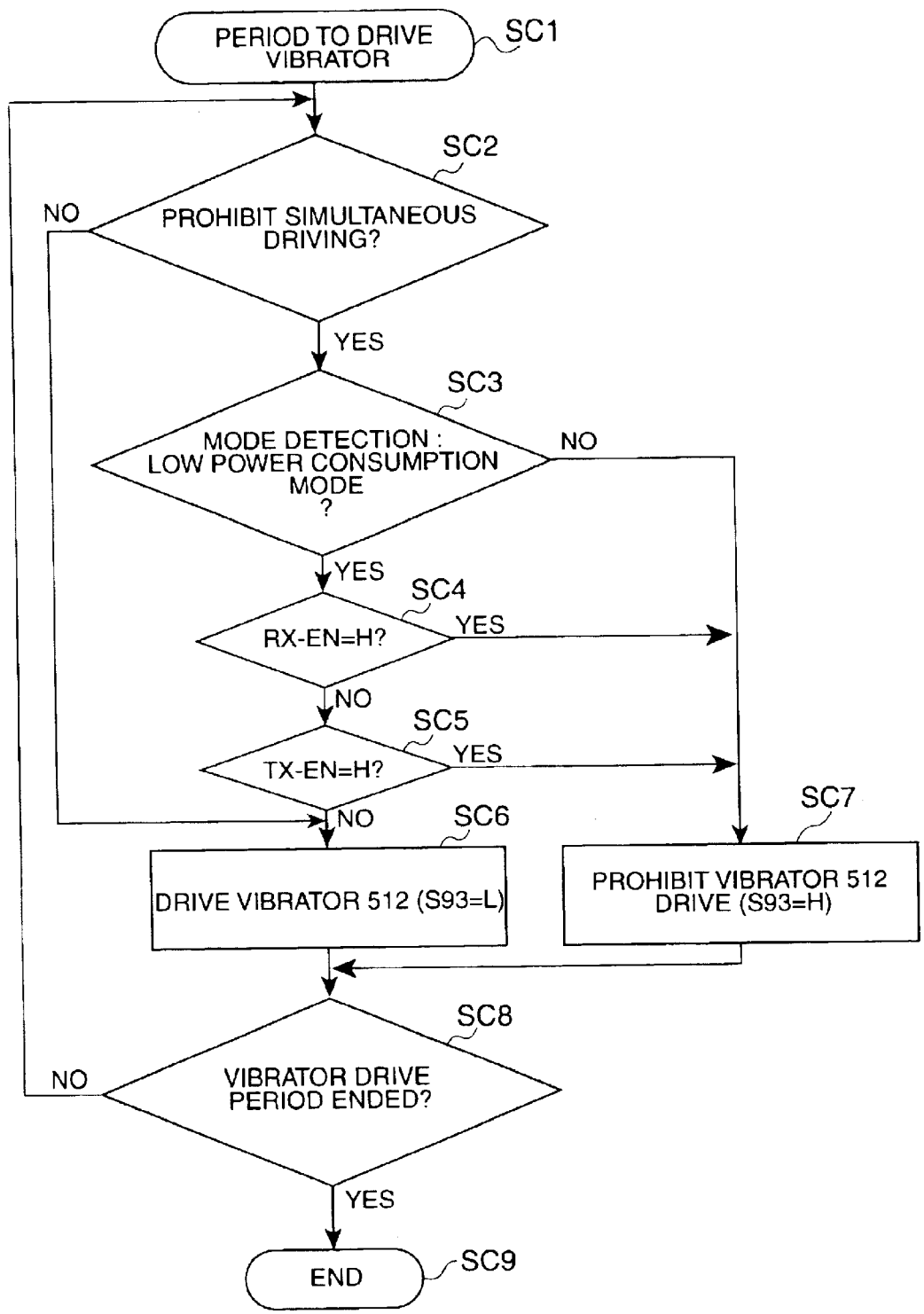
FIG. 26 is a flow chart showing the operation of the same embodiment.

FIG. 26 is a flow chart showing the content of a program run by the central control circuit 505 of wristwatch 50 to drive the vibrator 512.

When the vibrator 512 is to be driven (step SC1), central control circuit 505 first determines whether the wristwatch is in a "simultaneous driving enabled mode" in which the vibrator 512 can be driven simultaneously to the wireless communication operation (step SC2).

The wristwatch 50 being in the simultaneous driving enabled mode means that the battery 510 output voltage is greater than a specified level and sufficient power can be supplied to the circuits for wireless communication even if the vibrator 512 is driven during wireless communication. The wristwatch 50 not being in the simultaneous driving enabled mode means that the battery 510 output voltage (or remaining capacity) is below a specified level, and if the vibrator 512 is driven during wireless communication sufficient power cannot be supplied to the circuits for wireless communication and normal wireless communication is not possible.

The operation whereby the central control circuit 505 determines if the system is in the simultaneous driving enabled mode or not is described below.

The central control circuit 505 according to this embodiment of the invention intermittently supplies a high level control signal S91 to the reference voltage generating circuit 95 at a specified interval (1 sec, for example). It also monitors whether the output voltage of battery 510 is greater than a specified level.

When a high level control signal S91 is supplied from the central control circuit 505 to reference voltage generating circuit 95, transistors 96, 97 of the reference voltage generating circuit 95 turn on. Voltage-divided level V1 of the battery 510 output voltage is then supplied to the negative input terminal of the comparator 94 by resistances R1, R2.

When transistor 97 turns on, comparator 94 operates, and comparator 94 outputs the result of comparing voltage-divided level V1 of the battery 510 output voltage and reference voltage V2 as result signal S92 to the central control circuit 505.

If the central control circuit 505 determines from the result signal S92 output from comparator 94 that the voltage-divided level V1 of the battery 510 output voltage is greater than allowable minimum voltage V2, it determines that the wristwatch 50 is in the simultaneous driving enabled mode. On the other hand, if it is determined from the value of result signal S92 that the voltage-divided level V1 of the battery 510 output voltage is less than the allowable minimum voltage V2, it determines that the wristwatch 50 is not in the simultaneous driving enabled mode.

Retuning to the flow chart in FIG. 14, description of operation continues below.

When the wristwatch 50 is in the simultaneous driving enabled mode (step SC2: yes), the central control circuit 505 controls driving the vibrator 512 (step SC6). Specifically, the central control circuit 505 supplies a low level signal as the control signal S93 to the drive circuit 512d, thereby driving the vibrator 512. On the other hand, when the wristwatch 50 is not in the simultaneous driving enabled mode (step SC2: no), the central control circuit 505 applies control as described in the fifth embodiment above (FIG. 23).

That is, the central control circuit 505 evaluates the wristwatch 50 mode (step SC3) and if not in the low power consumption mode, that is, if in the active mode with frequent wireless communication occurring (step SC3: no), the central control circuit 505 controls prohibiting driving the vibrator 512 (step SC7). Specifically, the central control circuit 505 supplies a high level control signal S93 to the drive circuit 512d so that the vibrator 512 is not driven.

If the wristwatch 50 is in the low power consumption mode (step SC3: yes), the central control circuit 505 determines from the values of signal RX-EN of reception circuit 503 and signal TX-EN of transmission circuit 504 whether the wristwatch 50 is currently engaged in wireless communication (step SC4, SC5).

If the reception circuit 503 or transmission circuit 504 is operating and wireless communication is in progress (step SC4: yes, or step SC5: yes), the central control circuit 505 controls prohibiting driving the vibrator 512 (step SC7). Specifically, the central control circuit 505 supplies a high level control signal S93 to the drive circuit 512d so that the vibrator 512 is not driven.

On the other hand, if the reception circuit 503 and transmission circuit 504 are not operating and wireless communication is not in progress (step SC4: no and step SC5: no), the central control circuit 505 controls driving the vibrator 512 (step SC7). Specifically, the central control circuit 505 supplies a low level control signal S93 to the drive circuit 512d and thus drives the vibrator 512.

The central control circuit 505 according to this embodiment of the invention thus prevents driving the vibrator 512 during wireless communication when the output voltage of battery 510 is not sufficiently high.

Therefore, sufficient power is constantly supplied to the wireless communication circuits during wireless communication and normal wireless communication is assured.

G: Seventh Embodiment

The system configuration of this embodiment of the invention is substantially the same as the above-noted fifth embodiment. In addition, the wristwatch 50 of this embodiment has the same type of battery voltage detection circuit as in the sixth embodiment. However, the battery voltage detection circuit of this embodiment differs from the sixth embodiment in that it outputs a signal indicating if the battery 510 output voltage V is in the range above V1, the range less than or equal to V1 and greater than V2, or less than or equal to V2. In this case, however, V1>V2.

Figure 27:
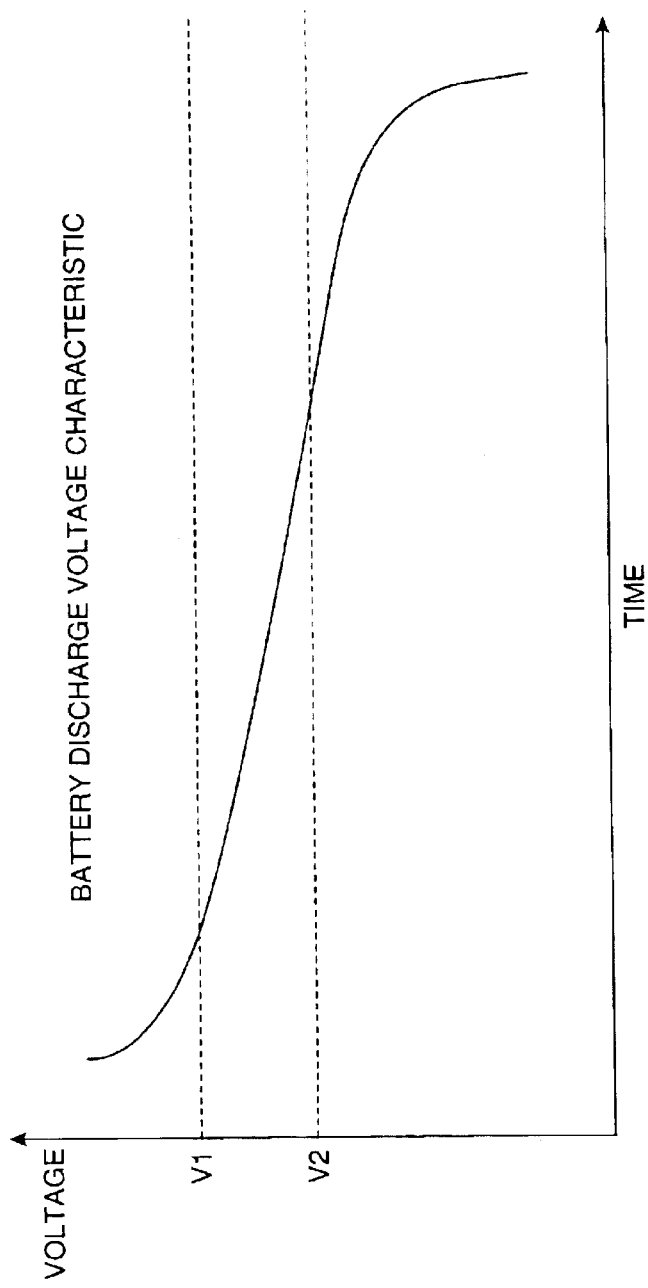
FIG. 27 shows the discharge characteristics of a battery in a wristwatch according to a seventh embodiment of the present invention.

FIG. 27 shows the discharge characteristics of the battery 510 by way of example, the horizontal axis denoting battery 510 usage time and the vertical axis denoting the battery 510 output voltage V. When the battery 510 output voltage V is greater than or equal to threshold level V1, the internal resistance of the battery 510 is sufficiently low, and even if too much consumption current flows an output voltage drop such as would adversely affect wireless communication will not occur. When the battery 510 output voltage V is in the V1 to V2 range, the internal resistance of the battery 510 is somewhat high and care must be taken so that excessive current does not flow from the battery 510 in order to not adversely affect wireless communication. When the battery 510 output voltage V is less than or equal to V2, the internal resistance of the battery 510 is extremely high and it is necessary to maximally suppress current flow from the battery 510 in order to not adversely affect wireless communication. This is the premise of the present embodiment.

A wristwatch according to this embodiment of the invention has a function for outputting an alarm by means of a buzzer notification or vibration notification when in the time band of the alarm setting. Which method is used for alarm output and whether alarm output is provided depends upon whether wireless communication is in progress at that time and which of the above three ranges the battery 510 output voltage is in at that time. This control is provided by the central control circuit 505.

This operation is described below.

Figure 28:
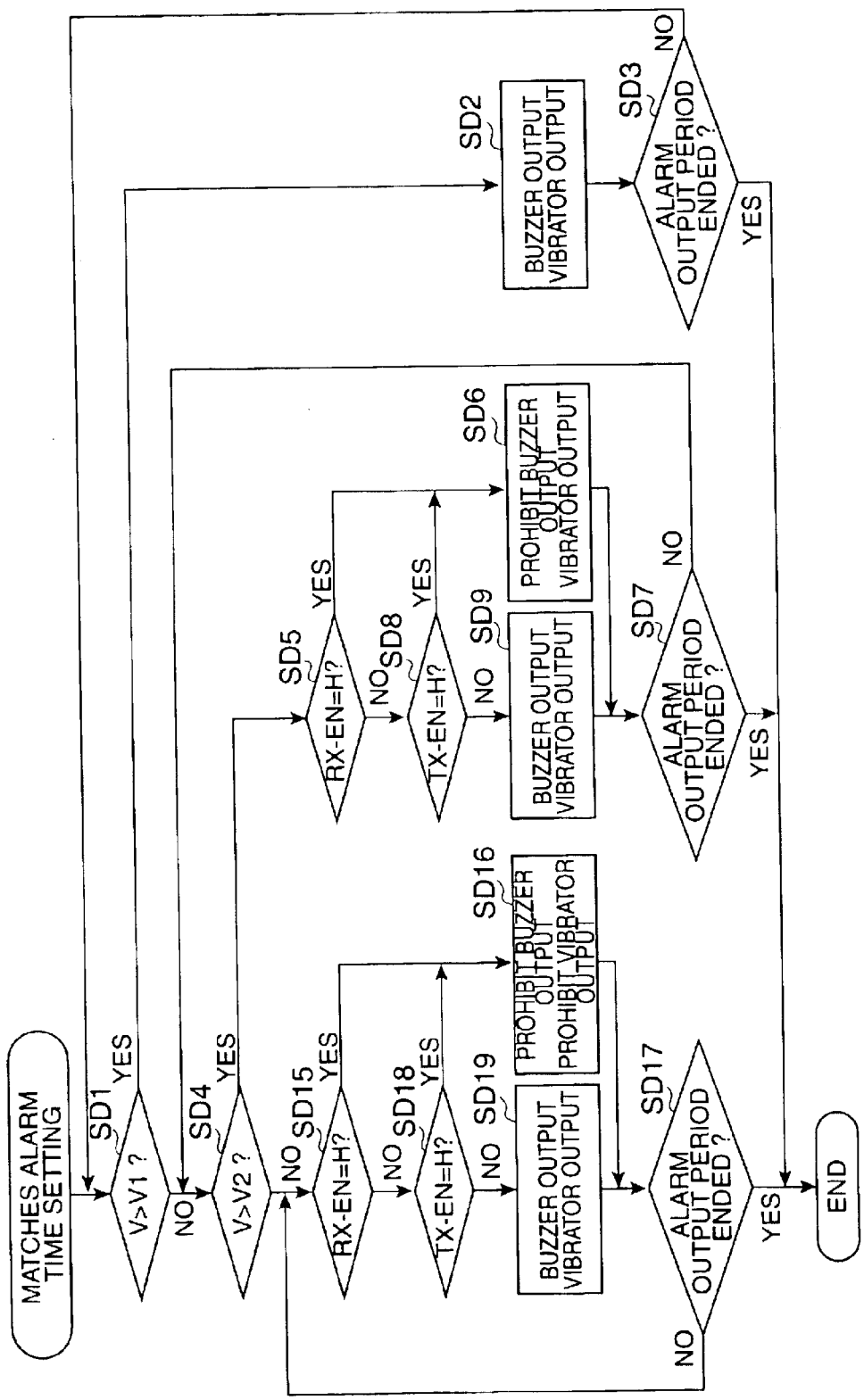
FIG. 28 is a is a flow chart showing the operation of the same wristwatch.

When the current time enters the time band of the alarm setting, the central control circuit 505 of the present embodiment begins to run the routine shown in the flow chart in FIG. 28.

The central control circuit 505 first determines based on the battery voltage detection circuit whether the battery 510 output voltage V is greater than V1 (step SD1). If the result of this determination is yes, the central control circuit 505 outputs the alarm using both the buzzer 511 and vibrator 512 (see FIG. 17) until the alarm period ends, and measures the duration of alarm output (step SD2). Steps SD1 and SD2 then repeat until the alarm output period ends, that is, until the duration of alarm output reaches a predetermined alarm output period, and terminates the routine shown in FIG. 28 at the conclusion of the alarm output period (step SD3).

When the battery 510 output voltage V is less than or equal to V1, the determination of step SD1 returns no. In this case the central control circuit 505 determines if the battery 510 output voltage V is greater than V2 (step SD4).

If the battery 510 output voltage V is less than or equal to V1 and greater than V2, the determination of step SD4 returns yes. In this case the central control circuit 505 determines if signal RX-EN supplied to the reception circuit 503 is high (step SDS). If this determination returns yes, the alarm is not output using the buzzer 511 and is output using only the vibrator 512, and the duration of alarm output is measured (step SD6). Steps SD1, SD4, SD5, SD6 thereafter repeat until the end of the alarm output period, and the routine shown in FIG. 28 terminates with the conclusion of the alarm output period (step SD7).

There are cases in which the determination of step SD5 returns no when control advances from step SD4 to step SD5. In this case the central control circuit 505 determines if signal TX-EN supplied to the transmission circuit 504 is high (step SD8). If this determination returns yes, the central control circuit 505 outputs the alarm using only the vibrator 512 and not using the buzzer 511, in the same way as when signal RX-EN is high, and measures the duration of alarm output (step SD6). Steps SD1, SD4, SD5, SD6 thereafter repeat until the end of the alarm output period, and the routine shown in FIG. 28 terminates with the conclusion of the alarm output period (step SD7).

If both signal RX-EN and signal TX-EN are low and wireless communication is not in progress, the determinations of both steps SD5 and SD8 return no. In this case the central control circuit 505 outputs the alarm using both the buzzer 511 and vibrator 512, and measures the duration of alarm output (step SD9). Steps SD1, SD4, SD5, SD8, and SD9 thereafter repeat until the end of the alarm output period, and the routine shown in FIG. 28 terminates with the conclusion of the alarm output period (step SD7).

If the battery 510 output voltage V is less than or equal to V2, the determination of step SD4 returns no. In this case the central control circuit 505 determines if signal RX-EN supplied to the reception circuit 503 is high (step SD15). If the result of this determination is yes, the alarm is not output using either the buzzer 511 or the vibrator 512 (step SD16). Whether the alarm output period has ended is then determined (step SD17). If the result of this step SD17 is no, the procedure returns to step SD15. Furthermore, if the result of step SD15 is no, the central control circuit 505 determines if signal TX-EN supplied to the transmission circuit 504 is high (step SD18). If the result of this determination is yes, the alarm is not output using either the buzzer 511 or the vibrator 512 (step SD16). Whether the alarm output period has ended is then determined (step SD17). If the result of this step SD17 is no, the procedure returns to step SD15. In this way the alarm is not reported using either the buzzer 511 or the vibrator 512 unless either signal RX-EN or signal TX-EN is high, and the loop of steps SD15, SD16, SD17 or the loop of steps SD15, SD18, SD16, SD17 repeats. Because the alarm is not output at all during this time the time that alarm output continues remains 0.

When both signal RX-EN and signal TX-EN go low, both step SD15 and step SD18 return no. In this case the central control circuit 505 outputs the alarm using both the buzzer 511 and vibrator 512, and measures how long alarm output continues (step SD19). Steps SD15, SD18, SD19, and SD17 thereafter repeat until the end of the alarm output period, and the routine shown in FIG. 28 terminates with the conclusion of the alarm output period (step SD17).

Figure 29:
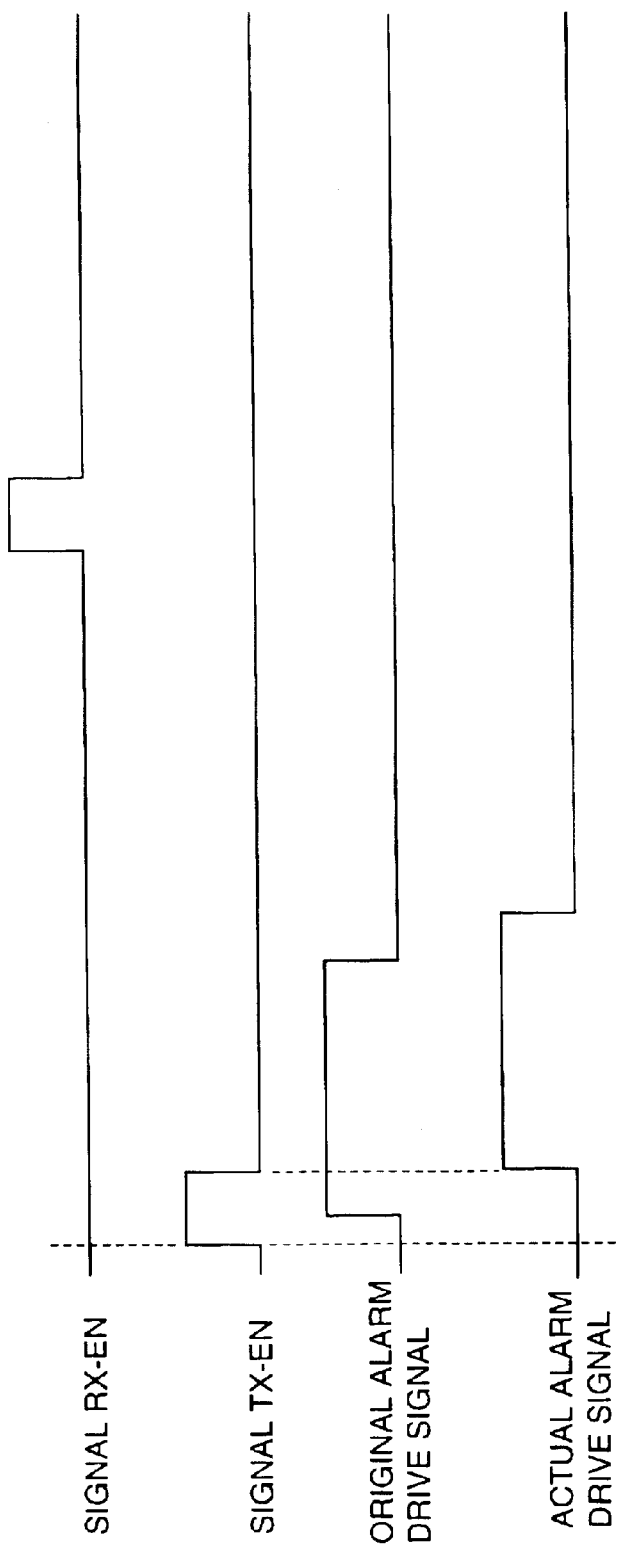
FIG. 29 is a timing chart showing the operation of the same wristwatch.

FIG. 29 is a timing chart showing the waveforms of each part during the above described operation by way of example. In this example the time band of the alarm setting starts when signal TX-EN is high, and the original drive signal instructing alarm output using the buzzer 511 and vibrator 512 is high. As shown in this example, the central control circuit 505 delays outputting the alarm while signal TX-EN is high, and then outputs the alarm for the specified alarm output period when signal TX-EN goes low. Though not shown in the figure, the same operation occurs if the time band of the alarm setting starts when signal RX-EN is high. This will be easily understood from the description of the operation of the present embodiment with reference to FIG. 28.

The fifth to seventh embodiments described above can be varied as follows.

Variation 1

Each of the above embodiments has been described assuming that driving the buzzer 511 or vibrator 512 during-wireless communication between the wristwatch 50 and portable terminal 45 will interfere with the wireless communication.

This, however, is described by way of example only, and if driving another function such as the light emitting unit 513 interferes with wireless communication, control prohibiting driving the light emitting unit 513, for example, and not just the buzzer 511 can be applied.

In such cases it is preferable to measure in advance whether driving any function of the wristwatch 50 will interfere with wireless communication.

For example, electromagnetic noise of a level sufficient to interfere with wireless communication is not produced when only the buzzer 511 is driven, but when the vibrator 512 is driven in addition to driving the buzzer 511, electromagnetic noise of a level sufficient to interfere with wireless communication can be expected.

The results of such measurements can be pre-stored to the memory 506 of wristwatch 50 with the central control circuit 505 performing the steps of the flow chart shown in FIG. 23 while evaluating the content of the memory 506.

Furthermore, the maximum allowable electromagnetic noise is preferably set to a level below that at which interference with the operation of wireless communication actually occurs, thereby allowing for variation in the occurrence of electromagnetic noise.

Variation 2

Furthermore, the portable terminal 45 is assumed to be the master device and the wristwatch 50 to be the slave device in wireless communication in the descriptions of the preceding embodiments, but the invention shall not be so limited as the portable terminal 45 can be the slave device and the wristwatch 50 can be the master device.

In this case an implementation identical in content to the above described embodiments can be achieved, and the same effects can be obtained, by the central control circuit 505 evaluating the current mode.

Variation 3

In the above embodiments the central control circuit 505 is assumed to uniformly set the input signal SB of the buzzer drive circuit 511*d* to high (VCC level) to drive the buzzer 511, but the content of this drive signal SB can be varied as desired.

For example, driving the buzzer 511 at a constant interval is one way to effectively output the alarm for the user of wristwatch 50.

Figure 30:
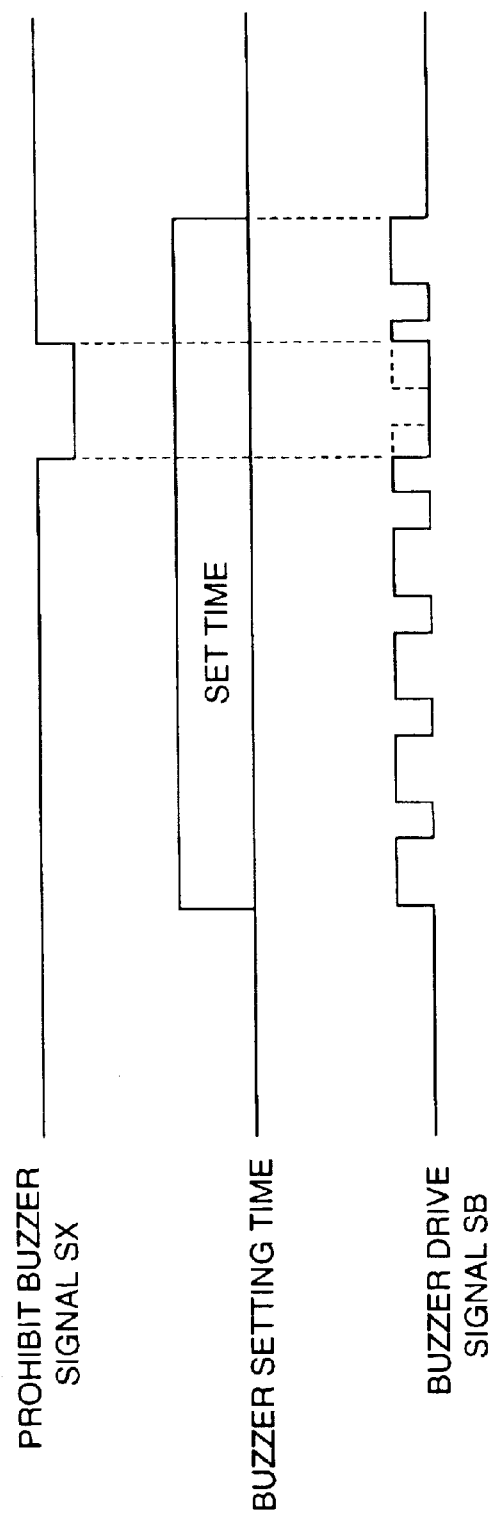
FIG. 30 is a timing chart showing operation of a variation of the fifth to seventh embodiments.

FIG. 30 is an operation timing chart when such a method is used.

Shown in FIG. 30 are prohibit buzzer signal SX, the alarm time setting, and the buzzer drive signal SB.

As shown in FIG. 30, the central control circuit 505 controls intermittently driving the buzzer 511 throughout the period in which the alarm is set and driving the buzzer is not prohibited by the prohibit buzzer signal SX (the period from time T92 to time T93, and the period from time T95 to time T96).

Such a configuration can achieve the same operation and effects as the above-described embodiments.

Variation 4

In the sixth embodiment and the seventh embodiment the mode for limiting alarm output during wireless communication is varied according to the output voltage of the battery 510. In this variation the remaining capacity of battery 510 is measured instead of the battery 510 output voltage, and the method of limiting the alarm output during wireless communication is changed according to the range of this remaining capacity. Specifically how this is changed is as described in the seventh embodiment with reference to FIG. 28, for example.

Figure 31:
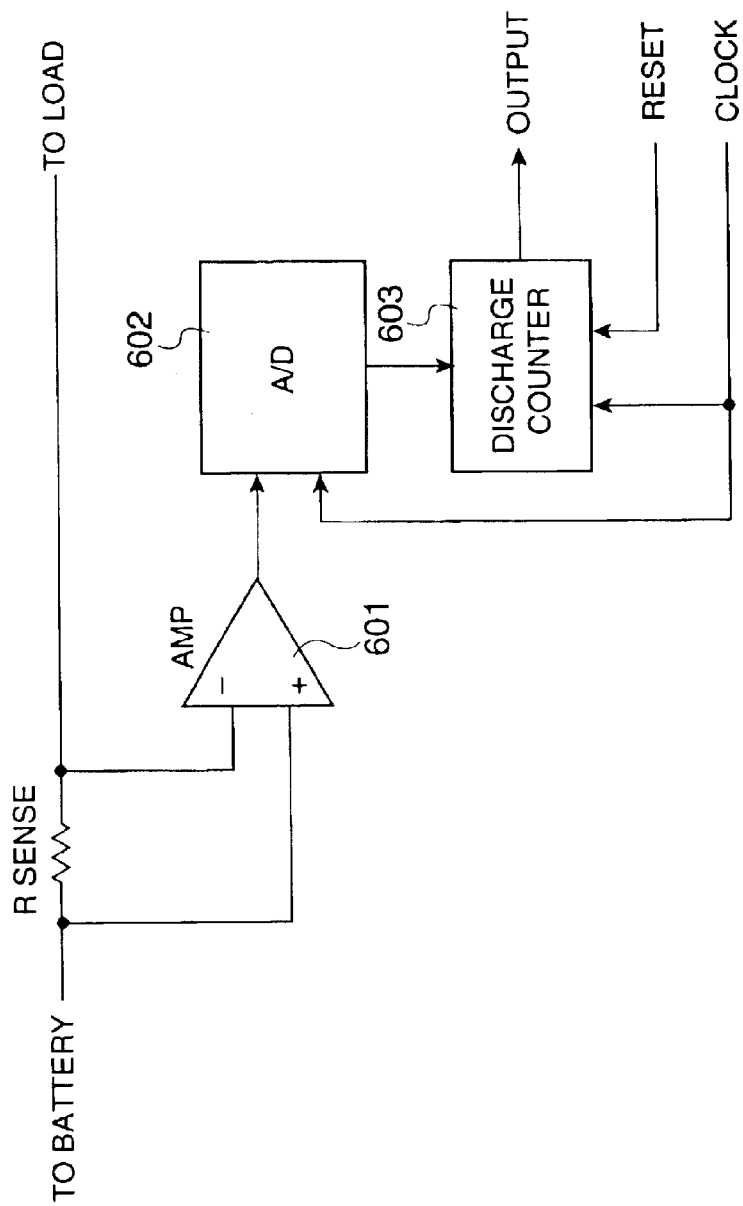
FIG. 31 is a circuit diagram showing the configuration of a residual battery capacity measurement circuit used in a variation of the seventh embodiment.

A circuit such as shown in FIG. 31, for example, can be used as the remaining capacity measurement circuit. This circuit comprises a current detection resistance RSENSE inserted in the current path between the battery 510 and load (the circuits inside the wristwatch 50), an operational amplifier 601 for outputting an analog signal proportional to the voltage at both ends of this current detection resistance RSENSE, an A/D converter 602 for sampling and converting the output signal of the operational amplifier 601 to digital data each time a clock of a specific frequency is applied, and a discharge counter 603 for accumulating the output data of the A/D converter 602 each time the same clock is applied. This discharge counter 603 is reset when the battery 510 is replaced with a new battery.

Thus comprised, the integral of current flowing through current detection resistance RSENSE, that is, a total equivalent to the total charge discharged from the battery 510, is obtained from the discharge counter 603. The central control circuit 505 can therefore determine the remaining capacity of the battery 510 from this accumulated total.

The wristwatch 50 can also be configured so that the battery 510 can be charged while the battery 510 is still loaded. In this case a current detection resistance is inserted both to the current path from the battery 510 to the load and to the battery 510 charge path, a circuit for measuring battery 510 discharge such as shown in FIG. 31 is connected to the former current detection resistance, and a similarly configured circuit for measuring battery 510 charging is connected to the latter current detection resistance. When this type of configuration is used the central control circuit 505 determines the remaining battery 510 capacity from the difference of the discharge and charge levels obtained from both measurement circuits, and alarm output can be limited based thereon.

It is also possible to measure the internal resistance instead of the remaining capacity of the battery 510 to limit alarm output when this internal resistance rises to a threshold level. One method of measuring the internal resistance of the battery 510 is a method based on the difference between the output voltage of the battery 510 when driving and the output voltage when not driving the wireless communication function unit.

Variation 5

It is assumed in the embodiments described above that Bluetooth is used as the wireless communication method, but other methods may be used. For example, a method using microwaves, a method using electromagnetic induction, or a method using infrared could be used, and various modulation methods such as direct sequence, for example, can be used as the modulation method for wireless communication.

In other words, the present invention can be applied insofar as the communication method is compatible with local wireless communication.

Variation 5

The embodiments described above relate a Bluetooth wireless communication function to a wristwatch 50, but the present invention shall not be so limited and can be, for example, various portable devices with a wireless communication function, including, for example, calculators, PDA (Personal Digital Assistants), translation machines, pedometers, and portable sphygmomanometers.

The form shall also not be limited to a wristwatch type, and various other configurations such as a card type, necklace type, or pendant type are possible.

Variation 6

This variation adds the function of the first control unit 110 and second control unit 120 in the above first embodiment to the central control circuit 505 (see FIG. 17) in the fifth to seventh embodiments.

In this variation the central control circuit 505 monitors the output voltage of the battery 510. The central control circuit 505 intermittently drives the wireless communication function unit including the reception circuit 503, transmission circuit 504, and PLL circuit 531 for wireless communication, and monitors the output voltage of the battery 510 at this time. If this output voltage then drops to a first threshold voltage, it prohibits driving the wireless communication function unit with the battery 510. If the battery 510 output voltage drops to a second threshold voltage after wireless communication function unit driving is thus prohibited, the central control circuit 505 prohibits driving the circuit contained therein for controlling the wireless communication function unit by means of the battery 510.

Furthermore, the central control circuit 505 applies control as described in the above fifth to seventh embodiments when intermittently driving the wireless communication function unit is prohibited and the battery 510 output voltage drops to or below a specified threshold voltage that is slightly higher than the first threshold voltage. That is, if a drive command for a load with heavy current consumption, such as the buzzer 511 or vibrator 512, is generated during communication by the wireless communication function unit, said drive does not occur.

The function of each of the control units in the second to fourth embodiments can likewise be provided to the central control circuit 505.

Variation 7

The recording medium for recording a program according to the present invention is also discretionary, and could be, for example, semiconductor memory, CD-ROM, (Compact Disc-Read Only Memory), CD-R (Compact Disc-Recordable), or other optical disc, MO (Magneto Optic), MD (Mini Disc), or other magneto-optical disc, floppy disk, hard disk, or other magnetic disk. Using such media the program can be supplied to the memory 506 of wristwatch 50 for control by a central control circuit 505 comprising a CPU, for example.

Furthermore, the method of installing the program is also discretionary: an above-noted recording medium can be used for installation to a wristwatch or other portable data device, or the program could be supplied to the memory of the wristwatch or other portable data device from a server storing the program according to the present invention by way of the Internet or other network, using a so-called network distribution mode.

What is claimed is:

1. An electronic device, comprising:
a battery;
a plurality of load groups including a heavy load group that is comprised of a plurality of heavy load units driven by the battery and a light load group that is comprised of a plurality of light load units and that consumes less power than the heavy load group;
a first control unit configured to monitor the output voltage of the battery and to control the supply of power from the battery to the heavy load group, when the output voltage of the battery is at or above a first threshold voltage; and
a second control unit configured to monitor the output voltage of the battery and to control the supply of power from the battery to the light load group and to the first control unit, when the output voltage of the battery drops below the first threshold voltage;
wherein, when the output voltage of the battery drops below the first threshold voltage, the first control unit (i) stops monitoring the output voltage of the battery, (ii) disables the supply of power from the battery to the heavy load group, the disabled power state of the heavy load group being maintained regardless of any future change in the output voltage of the power supply, and (iii) outputs an activation signal to activate the second control unit.

2. An electronic device as described in claim 1, wherein the difference between (i) a voltage drop due to internal resistance of the battery when driving the light load group, the first control unit, and the second control unit, and (ii) a voltage drop due to internal resistance of the battery when driving only the second control unit is less than a voltage detection resolution of the second control unit.

3. An electronic device as described in claim 1, wherein the heavy load group comprises a wireless communication unit;
the first control unit comprises means for controlling the supply of power from the battery to the heavy load group so that it is intermittently driven by the battery, and means for terminating intermittent drive of the heavy load group when the battery output voltage drops below the first threshold voltage while the heavy load group is being driven by the battery; and
the second control unit comprises means for responding to change in the battery output voltage faster than the first control unit, and for interrupting power supply from the battery to the first control unit and for terminating intermittent drive of the heavy load group when the battery output voltage drops below a third threshold voltage while the heavy load group is being intermittently driven by the battery.

4. An electronic device as described in claim 3, further comprising a third control unit configured to respond to change in the battery output voltage faster than the first control unit, and to prohibit the driving of the heavy load group by the battery when the battery output voltage, while the heavy load group is being driven by the battery, drops below a fourth threshold voltage that is lower than the first threshold voltage.

5. An electronic device as described in claim 4, wherein
the light load group comprises a light load for communicating that it is either time to recharge or replace the battery; and
the first control unit is configured to drive the communicating light load when the battery output voltage drops below the first threshold voltage while driving the load groups.

6. An electronic device as described in claim 5, wherein the communicating light load comprises a display device for indicating that it is time to recharge the battery by displaying a text message or image.

7. An electronic device as described in claim 6, wherein the communicating light load comprises an alarm device for indicating that it is time to recharge the battery by producing an alarm sound or vibration.

8. An electronic device as described in claim 1, wherein
the heavy load group comprises a wireless communication function unit driven by the battery for establishing intermittent two-way wireless communication with an external device; and
the electronic device further comprises
detection means for detecting a condition of the battery; and
a fourth control unit configured to prohibit the driving of at least one of the load units other than the wireless communication function unit if wireless communication is occurring when the detection means detects that the battery condition has reached a specific condition.

9. An electronic device as described in claim 8, wherein the detection means comprises a circuit for detecting the battery output voltage.

10. An electronic device as described in claim 8, wherein the detection means comprises a circuit for detecting remaining battery capacity.

11. An electronic device as described in claim 8, wherein the fourth control unit is configured to determine the load unit or combination of load units to be prohibited from being driven during wireless communication according to the detected battery condition.

12. An electronic device as described in claim 8, wherein the electronic device is able to assume (i) a low power consumption mode for wireless communication of synchronization signals during a specific period for maintaining synchronization of a wireless communication network formed with the external device, or (ii) an active mode for actual wireless data communication with the external device;
wherein the fourth control unit is configured to prohibit the driving of at least one of the load units other than the wireless communication function unit when the electronic device is in the active mode and also during wireless communication of the synchronization signals in the low power consumption mode.

13. An electronic device as described in claim 8, wherein wireless communication is carried out using Bluetooth technology.

14. An electronic device as described in claim 8, wherein the at least one load unit prohibited from being driven during wireless communication includes one or more of the following function units: a buzzer communication function unit for driving a buzzer, a vibration communication function unit for driving a motor for a vibrator, a light-emitting communication function unit for driving an LED, and a display function unit for driving a liquid crystal display unit.

15. A control method for an electronic device that includes a battery, a heavy load group, a light load group having lower power consumption than the heavy load group, a first control unit, and a second control unit, the control method comprising the steps of:
monitoring the output voltage of the battery using the first control unit, only when the output voltage of the battery is at or above a first threshold voltage;
controlling the supply of power from the battery to the heavy load group using the first control unit, when the output voltage of the battery is at or above the first threshold voltage;
disabling the supply of power from the battery to the heavy load group, when the output voltage of the battery drops below the first threshold voltage, the disabled power state of the heavy load group being maintained regardless of any future change in the output voltage of the power supply;
outputting an activation signal from the first control unit to the second control unit, when the output voltage of the battery drops below the first threshold voltage; and
monitoring the output voltage of the battery using the second control unit, when the output voltage of the battery drops below the first threshold voltage.

16. The control method as described in claim 15, further comprising the step of stopping the driving of the light load group by the battery when the battery output voltage drops below a second threshold voltage after stopping the driving of the heavy load group.

17. A program configured to run on a computer for controlling an electronic device, the program comprising instructions for:
monitoring the output voltage of the battery using the first control unit, only when the output voltage of the battery is at or above a first threshold voltage;
controlling the supply of power from the battery to the heavy load group using the first control unit, when the output voltage of the battery is at or above the first threshold voltage;
disabling the supply of power from the battery to the heavy load group, when the output voltage of the battery drops below the first threshold voltage, the disabled power state of the heavy load group being maintained regardless of any future change in the output voltage of the power supply;
outputting an activation signal from the first control unit to the second control unit, when the output voltage of the battery drops below the first threshold voltage; and
monitoring the output voltage of the battery using the second control unit, when the output voltage of the battery drops below the first threshold voltage.

18. The program as described in claim 17, further comprising instructions for stopping the driving of the light load group by the battery when the battery output voltage drops below a second threshold voltage after stopping the driving of the heavy load group.

19. A computer-readable storage medium for storing a program configured to run on a computer for controlling an electronic device, the program comprising instructions for:

monitoring the output voltage of the battery using the first control unit, only when the output voltage of the battery is at or above a first threshold voltage;

controlling the supply of power from the battery to the heavy load group using the first control unit, when the output voltage of the battery is at or above the first threshold voltage;

disabling the supply of power from the battery to the heavy load group, when the output voltage of the battery drops below the first threshold voltage, the disabled power state of the heavy load group being maintained regardless of any future change in the output voltage of the power supply;

outputting an activation signal from the first control unit to the second control unit, when the output voltage of the battery drops below the first threshold voltage; and monitoring the output voltage of the battery using the second control unit, when the output voltage of the battery drops below the first threshold voltage.

20. The computer-readable storage medium as described in claim 19, further comprising instructions for stopping the driving of the light load group by the battery when the battery output voltage drops below a second threshold voltage after stopping the driving of the heavy load group.

* * * * *